United States Patent
Gleichauf

(10) Patent No.: US 11,924,322 B2
(45) Date of Patent: Mar. 5, 2024

(54) BLOCKCHAIN FOR SECURING AND/OR MANAGING IOT NETWORK-TYPE INFRASTRUCTURE

(71) Applicant: ARM Ltd., Cambridge (GB)

(72) Inventor: Paul Harry Gleichauf, Los Altos, CA (US)

(73) Assignee: ARM Ltd., Cambridge (GB)

( * ) Notice: Subject to any disclaimer, the term of this patent is extended or adjusted under 35 U.S.C. 154(b) by 342 days.

(21) Appl. No.: 15/596,209

(22) Filed: May 16, 2017

(65) Prior Publication Data

US 2018/0337769 A1 Nov. 22, 2018

(51) Int. Cl.
| | |
|---|---|
| *H04L 9/06* | (2006.01) |
| *G06F 21/64* | (2013.01) |
| *H04W 4/70* | (2018.01) |
| *G06Q 20/06* | (2012.01) |
| *H04L 9/32* | (2006.01) |
| *G06Q 20/22* | (2012.01) |
| *G06Q 20/36* | (2012.01) |
| *H04L 9/14* | (2006.01) |
| *H04L 9/30* | (2006.01) |
| *H04L 67/12* | (2022.01) |

(Continued)

(52) U.S. Cl.
CPC .......... *H04L 9/0637* (2013.01); *G06F 21/645* (2013.01); *G06Q 20/065* (2013.01); *G06Q 20/0655* (2013.01); *G06Q 20/29* (2013.01); *G06Q 20/36* (2013.01); *H04L 9/14* (2013.01); *H04L 9/30* (2013.01); *H04L 9/3239* (2013.01); *H04L 9/3247* (2013.01); *H04L 67/12* (2013.01); *H04W 4/70* (2018.02); *G06Q 2220/00* (2013.01); *H04L 9/50* (2022.05); *H04W 4/38* (2018.02)

(58) Field of Classification Search
CPC ......... H04L 9/0637; H04L 67/12; H04L 9/14; H04L 9/3247; H04L 9/30; G06Q 20/36; G06Q 20/29; G06Q 20/065
See application file for complete search history.

(56) References Cited

U.S. PATENT DOCUMENTS

| | | | |
|---|---|---|---|
| 10,534,913 B2 * | 1/2020 | Daniel ................. | G06F 21/645 |
| 2016/0086418 A1 | 3/2016 | Smolen et al. | |

(Continued)

FOREIGN PATENT DOCUMENTS

| | | |
|---|---|---|
| CN | 106462841 A | 2/2017 |
| WO | 2015144971 A1 | 10/2015 |

OTHER PUBLICATIONS

Buterin, Vitalik. "Privacy on the Blockchain," https://blog.ethereum.org/2016/01/15/privacy-on-the-blockchain/ (Jan. 15, 2016) (Year: 2016).*

(Continued)

*Primary Examiner* — Elizabeth H Rosen
(74) *Attorney, Agent, or Firm* — Berkeley Law & Technology Group, Inc.

(57) ABSTRACT

Briefly, example methods, apparatuses, and/or articles of manufacture are disclosed that may be implemented, in whole or in part, using one or more Internet of Things devices to facilitate and/or support one or more operations and/or techniques for a blockchain for securing and/or managing IoT network-type infrastructure, such as implemented in connection with one or more computing and/or communication networks and/or protocols.

17 Claims, 14 Drawing Sheets

(51) Int. Cl.
*H04W 4/38* (2018.01)
*H04L 9/00* (2022.01)

(56) References Cited

U.S. PATENT DOCUMENTS

| | | | | |
|---|---|---|---|---|
| 2016/0330034 | A1* | 11/2016 | Back | G06Q 20/06 |
| 2017/0098291 | A1* | 4/2017 | Code | G06Q 40/02 |
| 2017/0124534 | A1* | 5/2017 | Savolainen | H04L 9/00 |
| 2017/0132620 | A1* | 5/2017 | Miller | H04L 9/3297 |
| 2018/0032945 | A1* | 2/2018 | Chetlur | G06F 3/038 |
| 2018/0191714 | A1* | 7/2018 | Jentzsch | H04L 9/3247 |
| 2018/0268382 | A1* | 9/2018 | Wasserman | G06Q 20/0655 |
| 2018/0268479 | A1* | 9/2018 | Dowling | G06Q 40/03 |
| 2018/0300693 | A1* | 10/2018 | Gopinath | H04L 9/3236 |
| 2019/0108498 | A1* | 4/2019 | Deshpande | G06Q 20/065 |
| 2019/0394047 | A1* | 12/2019 | Karame | G06F 21/64 |
| 2021/0385159 | A1* | 12/2021 | Mehmedagic | H04L 41/0806 |

OTHER PUBLICATIONS

Christidis, Konstantinos and Michael Devetsikiotis. "Blockchains and Smart Contracts for the Internet of Things," IEEE Access (May 10, 2016), vol. 4, pp. 2292-2303. (Year: 2016).*
Treleaven, Philip; Richard Gendal Brown; and Danny Yang. "Blockchain Technology in Finance," Computer, (Jan. 1, 2017), vol. 50, Iss. 9, pp. 14-17. (Year: 2017).*
PCT/GB2018/051329: ISR and Written Opinion, dated Jul. 19, 2018, 13 pages.
Response to Communication pursuant to Rules 161(1) and 162 EPC dated 1/3/2020, App. No. EP18727864.3, Filed Jul. 13, 2020, 23 Pages.
Communication pursuant to Article 94(3) EPC, App. No. EP18727864.3, dated Oct. 29, 2020, 7 Pages.
Response to Communication pursuant to Article 94(3) EPC, App. No. EP18727864.3, Filed Mar. 2, 2021, 11 Pages.
Communication pursuant to Article 94(3) EPC, App. No. EP18727864.3, dated Mar. 14, 2022, 7 Pages.
Response to Communication pursuant to Article 94(3) EPC, App. No. EP18727864.3, Filed Jul. 7, 2022, 13 pages.
Office Action, App. No. CN201880032101.8, dated Oct. 19, 2022, 17 pages.
Response to Office Action, App. No. CN201880032101.8, dated Mar. 3, 2023, 15 pages.
Communication pursuant to Article 94(3) EPC, App. No. EP18727864.3, dated Oct. 12, 2022, 10 pages.
Response to Communication pursuant to Article 94(3) EPC, App. No. EP18727864.3, Filed Jan. 23, 2023, 13 pages.
Office Action, App. No. CN201880032102.8, dated Oct. 19, 2022, 25 pages.
Response to Office Action, App. No. CN201880032102.8, Filed Mar. 3, 2023, 15 pages.
Office Action, App. No. CN201880032102.8, dated Jul. 7, 2023, 11 pages.
Communication pursuant to Rules 161(1) and 162 EPC, App. No. 18727864.3, dated Jan. 3, 2020, 3 pages.
Response to Communication pursuant to Rules 161(1) and 162 EPC, App. No. 18727864.3. Filed Jul. 13, 2020, 22 pages.
Communication pursuant to Article 94(3) EPC, App. No. 18727864.3, dated Oct. 29, 2020, 7 pages.
Response to Communication pursuant to Article 94(3) EPC, App. No. 18727864.3. Filed Mar. 2, 2021, 11 pages.
Communication pursuant to Article 94(3) EPC, App. No. 18727864.3, dated Mar. 14, 2022, 7 pages.
Response to Communication pursuant to Article 94(3) EPC, App. No. 18727864.3. Filed Jul. 7, 2022, 13 pages.
Communication pursuant to Article 94(3) EPC, App. No. 18727864.3, dated Oct. 12, 2022, 10 pages.
Response to Communication pursuant to Article 94(3) EPC, App. No. 18727864.3. Filed Jan. 23, 2023, 13 pages.
Communication pursuant to Article 94(3) EPC, App. No. 18727864.3, dated Jun. 12, 2023, 9 pages.
Response to Communication pursuant to Article 94(3) EPC, App. No. 18727864.3. Filed Jul. 24, 2023, 16 pages.

* cited by examiner

BLOCKCHAIN FOR SECURING AND/OR MANAGING IOT NETWORK-TYPE INFRASTRUCTURE

BACKGROUND

1. Field

The present disclosure relates generally to blockchain infrastructure and, more particularly, to a blockchain for securing and/or managing Internet of Things (IoT) network-type infrastructure.

2. Information

The Internet is widespread. The World Wide Web or simply the Web, provided by the Internet, is growing rapidly, at least in part, from the large amount of content or data being added seemingly on a daily basis. A wide variety of content or data in the form of stored signals, such as, for example, text files, images, audio files, video files, web pages, measurements of physical phenomena, or the like is continually being acquired, identified, located, retrieved, collected, stored, communicated, etc. Increasingly, content or data is being acquired, collected, communicated, etc. by a number of embedded computing devices leveraging existing Internet or like infrastructure as part of the so-called "Internet of Things" or IoT, such as via a variety of protocols, domains, and/or applications. The IoT is typically a system of interconnected and/or internetworked physical devices in which computing is embedded into hardware so as to facilitate and/or support devices' ability to acquire, collect, and/or transfer content or data over one or more communications networks, for example, at times, without human participation and/or interaction. IoT devices may include a wide variety of embedded devices, such as, for example, automobile sensors, biochip transponders, heart monitoring implants, kitchen appliances, locks or like fastening devices, solar panel arrays, home gateways, or the like capable of being identified (e.g., uniquely, via an assigned Internet Protocol (IP) address, etc.) and/or having the ability to transfer content or data over one or more communications networks. Continued advancements in information technology, communications, etc. help to contribute to a rapidly growing market for IoT devices, which are becoming more ubiquitous in our increasingly interconnected world, such that it may soon be impossible to buy a non-Internet-connected device.

In some instances, the nature of IoT devices, such as by virtue of having an embedded computing and/or communication capability, for example, which may include a capability to automatically access the Internet, as was indicated, may make the IoT devices vulnerable. For example, at times, IoT devices may be prone to hacking or other security risks. To illustrate, a remote door lock may, for example, have a command injection flaw that may make the lock vulnerable to password "sniffing" where a captured command may be used to open the lock. As another example, a heart monitoring implant may have an open point connection that could be exploited to disable a safety feature and/or take control of the device. As yet another example, a thermostat may have a weak plain text protocol that may lead to complete compromise of such a device.

At times, detecting and/or tracking down origins of these or like malicious behaviors as well as restricting further corrupt practices with respect to IoT devices may be difficult. For example, typical log files that embedded or other devices may use to record computer events, software runs, network-related communications, etc., if available and/or applicable, may also be prone to hacking. Log files may, for example, be erased, modified, deleted, etc., which, in some instances, may prevent computer forensics investigations with respect to the nature and/or extent of unauthorized network intrusions. In addition, typical IoT intrusion detection and/or prevention practices may, for example, be rather remedying in nature (e.g., after-the-fact, etc.), may involve utilization of a relatively large number of participating security systems and/or infrastructures, or the like. Also, in some instances, local or internal clocks may not be available for IoT devices, and, if present, may not be sufficiently synchronized via networked time or other appropriate approaches. Further, one or more events serialized in a log file may be timestamped in some manner, for example, but, at times, these or like timestamps may not appear in a monotonically increasing order. Thus, resilient and/or adaptable interpretation of time ordering of logged events may also be useful.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
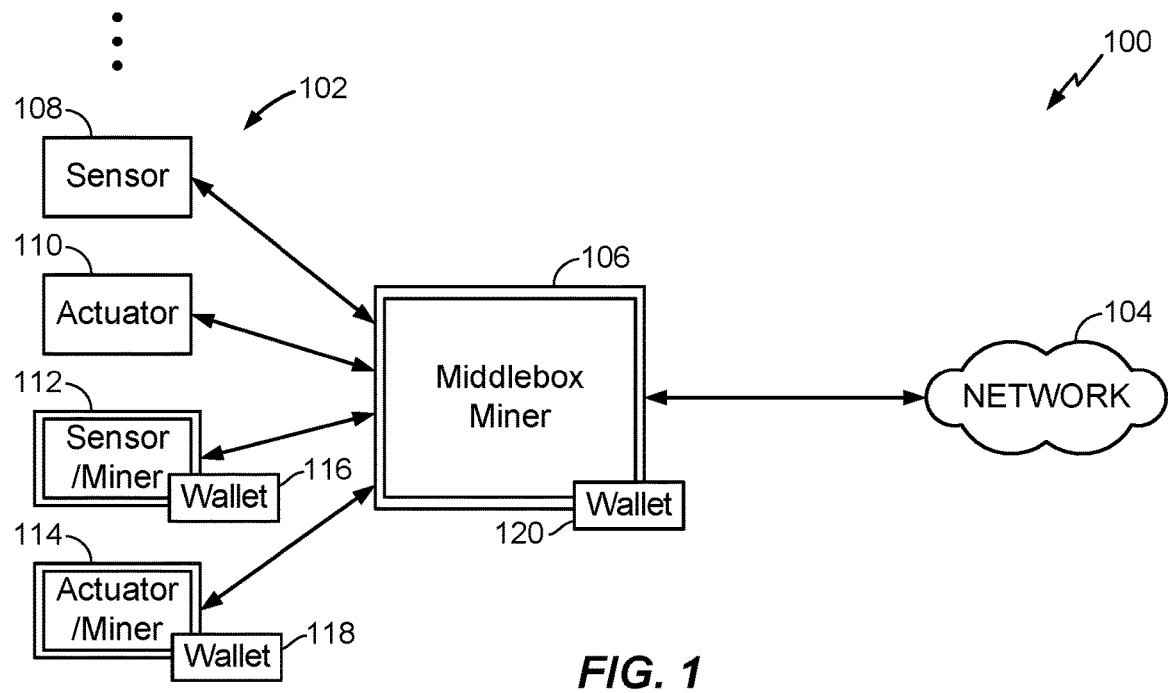
FIG. 1 is a schematic diagram illustrating features associated with an implementation of an example operating environment for a blockchain for securing and/or managing IoT network-type infrastructure.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. More specifically, throughout the present disclosure, in applicable message flows for electronic transactions that are added to a block for an identified function and/or service, a miner reward is shown as part of the block referencing an illustrated functionality, such as omitting one or more transaction validations, timestamps, rewards, block writers, block broadcasts, or the like. In addition, in a sequence of state transitions (e.g., time increasing from top to bottom, etc.) that a block undergoes to be verified by a miner, the block may reference a specific set of functional transactions and the block reward, for example, and may omit a writer of the block, transaction validation rewards, etc. Also, a blockchain sidechain may not be explicitly included, such as also for ease of discussion, but, as well as other aspects, as was indicated, may be implicit. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Some example methods, apparatuses, and/or articles of manufacture are disclosed herein that may be used, in whole or in part, to facilitate and/or support one or more operations and/or techniques for a blockchain for securing and/or managing IoT network-type infrastructure, such as implemented in connection with one or more computing and/or communication networks and/or protocols (e.g., network protocols) discussed herein, for example. As alluded to previously, at times, securing devices within an IoT network-type infrastructure may present a number of challenges due, at least in part, to their inherent ability to automatically access and/or communicate on a network, such as the Internet, as one possible example. Typically, although not necessarily, in contrast to more advanced computing platforms with more sophisticated anti-virus and/or malware defenses, many IoT devices may comprise, for example, end-point and/or resource-constrained embedded devices that utilize lower-cost hardware and/or software solutions lacking computing power to run a sufficient security software. As such, in some instances, IoT devices may be vulnerable to, for example, brute-force attacks or other nefarious log-in exploits that may give attackers access to and/or control of the devices and, as a consequence, compromise associated services, systems, networks, or the like.

In some instances, to address these or like challenges, one or more IoT intrusion detection and/or prevention techniques, such as, for example, monitoring log-in requests, bandwidth and/or network use, port probing attempts, etc. may, for example, be utilized, in whole or in part. At times, these or like techniques, however, may be operationally expensive, may be dependent upon specific threats and/or security objectives, may require a professional security team to properly setup, interoperate, and/or maintain a security system, may involve solutions requiring a relatively large, complex, and/or dedicated infrastructure, or the like. In addition, a number of typical IoT intrusion detection and/or prevention techniques may revolve around after-the-fact remediation rather than prevention strategies, as mentioned above, such as by relying on log files, for example. For log files to provide a sufficient measure of security, however, logging for a particular IoT device may need to be separately activated, for example, an associated log file may need to be checked and/or maintained on a continual basis, or the like.

At times, log files may also be prone to hacking, for example, and, consequently, to erasures, modification, or like tampering, as was also indicated. A compromised log file may, for example, be deleted, which may prevent its examination. In some instances, a compromised log file may also be replaced with a copy showing normal or typical network activity, which may make intrusion detection difficult or impossible. Accordingly, it may be desirable to develop one or more methods, systems, and/or apparatuses capable of ensuring secure operation and/or proper behavior of IoT devices, such as commensurate with their role and/or identity, for example, while tracking down origins of malicious behavior as well as restricting and/or preventing further corrupt practices via a complete unforgeable audit trail. For example, as will be seen, in some instances, a self-policing unforgeable distributed log capable of preventing or reducing over expenditure via accounting for transaction-related debits and credits may be implemented herein, in whole or in part, such as in the form of a blockchain and related infrastructure.

Thus, as will be described in greater detail below, in an implementation, one or more blockchain techniques may, for example, be utilized, in whole or in part, to construct a self-sustaining system of interconnected and/or internetworked IoT devices in which an integrated cost metric may be advantageously utilized to control orderly monitoring, consumption, and/or security of the devices, among other things, such as down to finer levels of granularity. As will also be seen, an integrated cost metric may comprise, for example, a digital currency micropayment, such as implemented at a network scale in connection with a blockchain so as to enforce authentication, authorization, audit, or other applicable policies and/or functionalities, security-related or otherwise, packaged together in distributed multiple copies of the blockchain. A digital currency micropayment, thus, may be used, at least in part, to monitor health of any appropriate and/or applicable infrastructure and/or associated system of IoT devices, even if certain audit trail information, such as data values, miner identities, etc. is encrypted (e.g., in a public blockchain, etc.). Namely, as also described below, authentication, authorization, audit, or other applicable policies and/or functionalities may, for example, be advantageously expressed as one or more electronic transactions that enter into a blockchain with analytics of pre- as well as post-occurrence fraud detection, such as via debits and/or credits for accounting of such digital currency micropayments. For example, if a particular IoT device is overspending its digital currency beyond its typical or normal patterns, it may have to seek a loan or de-prioritize its tasks, which may signal to an overall system of IoT devices that there may be a problem (e.g., hacking, intrusion, tampering, etc.). As such, a single common mechanism, such as in the form of digital currency, for example, may be advantageously integrated into and/or comprise an inherent part of highly distributed IoT infrastructure, which may be resilient against tampering, node failures, false positive attack identifications, etc., perform well under network partition, or the like.

For purposes of explanation, a blockchain typically comprises a content or data structure, such as in the form of an un-forgeable read-and-add-only ledger, for example, having a number of serially ordered, back-linked blocks of validated electronic transactions that may be widely copied to who may need to read from or write to it. A block is typically a container-type content or data structure that aggregates a list of electronic transactions and references—or "links" back—to a previous block in a chain, also called a "parent" block, via an effectively mathematically unique digital fingerprint of the previous block or so-called block "hash." As such, in a blockchain, each block contains a hash of its parent block, thus, linking blocks in the chain via a sequence of hashes all the way to the very first block or so-called "genesis" block. Because a current block's hash incorporates and, thus, affects a previous block's hash in a blockchain, changing or modifying a parent block would modify a hash of its child's block. In turn, changing or modifying a child block would modify a hash of a grandchild's block and so on. Such a structure may, for example, ensure that, once a block has a larger or otherwise sufficient number of subsequent or next generation blocks, the block may be difficult to modify due, at least in part, to an expensive effort involving re-computations of all previous blocks. As such, if an existing block in a blockchain is changed, then subsequent blocks must be recomputed, at a considerable computational cost. Therefore, older blocks age to become accepted transaction history, and, as such, more secure as a result.

As used herein an "electronic transaction" or simply "transaction" refers to a signed content or data structure indicating an agreement, communication, recordation, or some other electronic event. For example, a transaction may comprise a transfer of value (e.g., a digital currency, etc.), transfer of assets and/or rights (e.g., e real estate property, etc.), confirmation of an identity (e.g., authentication, etc.), confirmation of access rights to a resource and/or function (e.g., authorization, etc.), assignment of available resources to one or more devices (e.g., resource allocation, etc.), assignment of a responsibility and/or authority to another device (e.g., delegation, etc.), or the like. A transaction may, for example, be signed via any suitable digital signature, such as via a public key, private key, or the like, or any combination thereof. At times, a transaction may reference a previous transaction's output as new transaction input, for example, and may assign one or more input values to new output. A transaction may or may not be encrypted, in whole or in part. Particular examples of various transactions will be discussed in greater detail below.

One or more transactions within a block may, for example, be validated by a particular network node, known as a mining node or "miner," such as by finding a correct solution to a mathematical problem or puzzle via repeated cryptographic hashing operations, which may include, for example, a secure randomized distributed election of a miner node to be allowed to write a next block. Thus, as used herein, blockchain "mining" or simply "mining" refers to a process of validating a block of electronic transactions by a mining node or "miner," such as for inclusion in a blockchain, for example, via solving a blockchain problem or puzzle, secure randomized distributed election process, etc., which may qualify the mining node or miner for a reward and/or appropriate fee. In this context, the terms "mining node" and "miner" may be used interchangeably and refer to a network node capable of solving a blockchain problem or puzzle via one or more cryptographic hashing operations. A form of consensus algorithm or approach used to decide that a block is a valid candidate for addition to a blockchain may, for example, depend, at least in part, on blockchain design tradeoffs. For example, in some instances, a proof-of-work-type consensus algorithm or rule may be used, in whole or in part, though claimed subject matter is not so limited.

At times, a proof-of-stake-type process or approach may be used, in whole or in part, such as via employing an escrow account for a particular miner and/or levying against disincentives to prevent or lessen improper miner behavior. At other times, one or more algorithmically randomized verifiers may, for example, be used, at least in part, to select an ephemeral subgroup of miner nodes, such as to verify one or more applicable transactions and/or write a next block (e.g., Algorand or the like). Again, claimed subject matter is not limited to a particular algorithm or approach. To solve a puzzle, a miner may typically compete with other miners on a network, such as by generating fixed-length hashes by repeatedly trying to vary an output of a hash until a resulting hash matches specific requirements. Having solved a blockchain puzzle, a miner may, for example, be rewarded with digital currency and may record its validated block of electronic transactions in a blockchain. At times, to be included in a blockchain, a validated block may also be verified or confirmed, such as by other miners on a network to ensure that the block complies with consensus rules (e.g., includes a correct solution to a puzzle, has a syntactically valid structure, etc.), network-wide or otherwise.

As will also be seen, in some instances, certain IoT devices may act as miners, for example, such as by validating one or more blocks of electronic transactions while using their spare or "idle" cycles of associated processing units, as appropriate and/or applicable, and may earn digital currencies that may be banked in local digital wallets and/or expended for future electronic transactions. At times, a mining capability of IoT devices may depend, at least in part, on a type of a device. For example, certain IoT devices, such as lower-end and/or power constrained (e.g., battery operated, etc.) sensors and/or actuators may be less likely to have resources for mining using a conventional blockchain protocol (e.g., Bitcoin proof-of-work, etc.), but may be able to participate in one or more evolving forms (e.g., Bitcoin-Next Generation (NG), ByzCoin, Algorand, etc.).

Certain IoT devices, such as sensors and/or actuators powered parasitically and/or by renewable energy (e.g., a solar cell, etc.), for example, may be capable of mining, but may not be able to contribute sufficient or suitable spare cycles and, as such, their chances of validating blocks for a permissionless (e.g., public) blockchain may be somewhat diminished. In permissioned (e.g., private) blockchains, however, difficulty of finding a valid proof of work may be increased rather slowly (or even remain constant), thereby creating more opportunities for a wider range of IoT devices to participate in and/or benefit from mining. In the algorithmically-chosen random verifier case, as another example, a subgroup of miner nodes may, for example, be selected to verify one or more applicable transactions, but a burden may be amortized across all or most suitable and/or available nodes at selection time, and/or may be weighted by device capabilities, applicable resources, or the like.

Certain higher-end IoT devices, such as middleboxes collecting, processing, etc. content or data from peripheral or edge IoT devices, providing updates and/or context back to peripheral or edge IoT devices, etc. may, for example, have access to sufficient energy sources and, as such, may be capable of mining on a larger scale. Likewise, particular examples of various types of IoT devices, such as sensors, actuators, middleboxes, as well as their respective functions will be discussed in greater detail below.

Depending on an embodiment, one or more operations and/or techniques for a blockchain for securing and/or managing IoT network-type infrastructure may, for example, be implemented, at least in part, in connection with a public blockchain, private blockchain, or any combination thereof. A public blockchain may, for example, comprise blocks that may be added by any participating untrusted and/or trusted miner that joins a network with a public key identifier as well as an associated private key, such as to prove their identity in message exchanges with other members of the network. In such a case, it may be useful at times to encrypt communications and/or identities of participating IoT devices, for example, such as to avoid or reduce leaking private or other information, although exchanges of digital currencies may be part of public record that may be used, in whole or in part, for auditing, among other things. One of the advantages of a public blockchain may be that a larger number of participating miners may be utilized, for example, but, in exchange, fewer miners may be trusted. In some instances, this may make it harder to assure fairness in a competition to validate block entries, for example.

This, in some instances, one or more operations and/or techniques for a blockchain for securing and/or managing IoT network-type infrastructure may, for example, be implemented, at least in part, in connection with a private blockchain, such as a blockchain to which a set of trusted miners may be allowed to add blocks of electronic transactions, for example. These miners may have been vetted by some central and/or trusted organization, for example, or they may have been invited or excluded by one another via some applicable network policy. One of the advantages of a private blockchain may be that because miners may be verified and/or profiled, validation problem difficulty may, for example, be limited in some manner, such as to assure security. At times, this may, for example, allow lower-end IoT devices to more fairly participate in blockchain mining, such as in competition with more capable devices on a network, for example. Thus, once access to a digital wallet for an IoT device is configured, the wallet may be filled with digital currency, such as through the device's own efforts and/or through "allowance" transactions with another device, for example, and a blockchain (e.g., private, public, etc.) may then track micropayments made for a particular device in connection with a particular electronic transaction, as will also be seen.

With this in mind, attention is drawn to FIG. 1, which is a schematic diagram illustrating features associated with an implementation of an example operating environment 100 that may be used, in whole or in part, to facilitate and/or support one or more operations and/or techniques for a blockchain for securing and/or managing IoT network-type infrastructure. As seen, example operating environment 100 may comprise, for example, a number of peripheral or edge IoT devices, such as one or more sensors and/or actuators, referenced generally at 102, that may communicate with each other and/or other external devices (not shown) associated with a communications network 104, if applicable, through a higher-end IoT device, such as a middlebox 106. As such, in some instances, middlebox 106 may, for example, serve as an intermediary between IoT devices associated with operating environment 100, and/or may "shield" these or like devices from network 104, may aggregate, correlate, filter, etc. applicable data, such as for one or more communications.

As used herein, "sensor" refers to a network device having a capability of detecting, measuring, and/or communicating a physical property and/or phenomena, such as in the form of one or more digital signals and/or states, for example, without affecting and/or interacting with an associated physical environment. A sensor may comprise, for example, a temperature gauge embedded in a thermostat, an oxygen meter embedded in a car's emission control system, a motion sensor embedded in an automatic door, etc., and a physical property and/or phenomena may comprise, for example, light, heat, motion, moisture, pressure, or the like. Claimed subject matter is not limited to these particular examples, of course.

Further, in this context, "actuator" refers to a network device having a capability of affecting and/or interacting in some manner with an associated physical environment, such as via a controlled output, for example, sometimes in response to and/or conjunction with one or more sensors. An actuator may comprise, for example, a valve embedded in a petrochemical refinery passageway, a piezoelectric bimorph embedded in a microelectromechanical (MEMS) system, a relay embedded in a door locking device, etc., and a controlled output may comprise, for example, motion, force, speed, acceleration, rotation, or the like. A "middlebox," as used herein, refers to a network device capable of facilitating and/or supporting networking or other suitable electronic communications between a number of IoT devices, such as for purposes of security and/or performance, network-related or otherwise. A middlebox may comprise, for example, a firewall, an intrusion detection and/or prevention system, a gateway (e.g., router, intermediate network service node, etc.), a Network Address Translator (NAT), a wireless area network (WAN) optimizer, a load balancer, or the like. Likewise, claimed subject matter is not so limited.

As seen, in an implementation, certain sensors and/or actuators associated with operating environment 100, such as a sensor 108 and an actuator 110, for example, may comprise resource-constrained peripheral or edge IoT devices with limited processing and/or storage capabilities. As such, these or like IoT devices may be incapable of computing applicable cryptographic functions, such as for purposes of blockchain mining, for example. In some instances, these or like IoT devices may also lack sufficient resources and/or capabilities to hold, manage, secure, etc. a digital currency wallet, for example. In such a case, sensor 108 and/or actuator 110 may, for example, need to delegate these or like functionalities to another, more capable IoT device, such as middlebox 106, for example, as will be discussed below. In this context, "digital currency wallet" or simply "wallet" refers to a container-type content or data structure capable of storing one or more digital currency-related values representative of digital keys, addresses, signatures, etc. At times, a wallet may, for example, be implemented as a structured file, though claimed subject matter is not so limited. Digital currency wallets are generally known and need not be described here in greater detail.

As also illustrated, in some instances, certain sensors and/or actuators associated with operating environment 100, such as a sensor 112 and an actuator 114 may comprise more capable and/or less resource-constrained peripheral or edge IoT devices, such as devices having less limited processing and/or storage capabilities than, for example, sensor 108 and actuator 110. Here, processing and/or storage capabilities of sensor 112 and actuator 114 may, for example, enable these or like devices to participate in mining, earn digital currency for services provided and/or spend digital currency for services received and, thus, hold, manage, secure, etc. a digital currency wallet, referenced at 116 and 118, respectively, or the like. Devices capable of both sensing and mining are denoted as sensor/miners, such as sensors capable of mining. In their role as sensors they may provide information about their environment, for example, which may be exchanged in a transaction that is appropriately valued by one or more other nodes.

At times, a sensor/miner that is not involved in a given such transaction may, for example, act as a validator or author of a block and in that role may be rewarded for its services. Similarly, the same approach may apply for actuators that may also mine or actuators/miners. As was indicated and as seen, middlebox 106 may comprise, for example, a higher-end IoT device with sufficient processing and/or storage capabilities and, as such, may also act as a miner and, thus, may hold and/or manage a digital currency wallet, referenced at 120. Depending on an implementation, middlebox 106 may, for example, utilize its spare resources to mine to support a system of local interconnected and/or internetworked IoT devices shielded from network 104 (e.g., sensors and/or actuators 102, etc.), and/or to mine as a globally available (e.g., via the Internet, etc.) service. Although not shown, in some instances, middlebox 106 may also hold and/or manage one or more digital wallets on behalf of less capable IoT devices, such as sensor 108 and/or actuator 110 for example, and may prioritize a number of services among these or like IoT devices. Particular examples of services that may be rendered by middlebox 106 will be discussed below.

Communications network 104 may comprise any suitable wired or wireless communications network, for example, or any suitable combination of such networks, such as a public network (e.g., the Internet, the World Wide Web), private network (e.g., an intranet), wireless wide area networks (WWAN), wireless local area networks (WLAN), or the like. Thus, depending on an implementation, network 104 may comprise, for example, Internet Protocol (IP)-type infrastructure, cellular communication network infrastructure, one or more IoT resource friendly wireless protocols, such as LoRa, NB-IoT, SigFox, Zigbee, WiFi, Bluetooth, Thread, Powerline, X10, among others, or the like, or any combination thereof. As illustrated via a number of double-sided arrows, one or more electronic communications between one or more sensors and/or actuators 102, middlebox 106, and/or one or more external devices associated with network 104 may, for example, be facilitated and/or supported via one or more communication links. These or like communication links may comprise, for example, any suitable wired or wireless communication links, or any combination thereof, which may also depend on a particular implementation, network, electronic communication, or the like.

Even though a certain number of IoT devices and/or networks are illustrated herein, any number of suitable IoT devices and/or networks may be implemented to facilitate and/or support one or more techniques and/or processes associated with operating environment 100. For example, at times, network 104 may be coupled to one or more other wired and/or wireless communication networks (e.g., WLAN, etc.) so as to enhance a coverage area for communications with middlebox 106, one or more external devices, etc. In some instances, such as if complexity of tasks within operating environment 100 increases, for example, middlebox 106 may act as a sensor and/or an actuator and, as such, may depend on one or more services provided by more capable intermediary IoT devices that may scale up one or more middlebox functions. As such, to gain scale, if appropriate and/or applicable, a hierarchy shown may, for example, be iterated or otherwise modified in a suitable manner, such as without deviating from the scope of claimed subject matter. At times, operating environment 100 may also comprise a number of intelligent peripheral or edge sensors and/or actuators, which may, for example, be considered as fully functional middleboxes, conventional Internet nodes (e.g., networking switches, routers, storage and/or compute nodes, etc.), or the like. Again, these are merely example implementations, and claimed subject matter is not limited in this regard.

Figure 2:
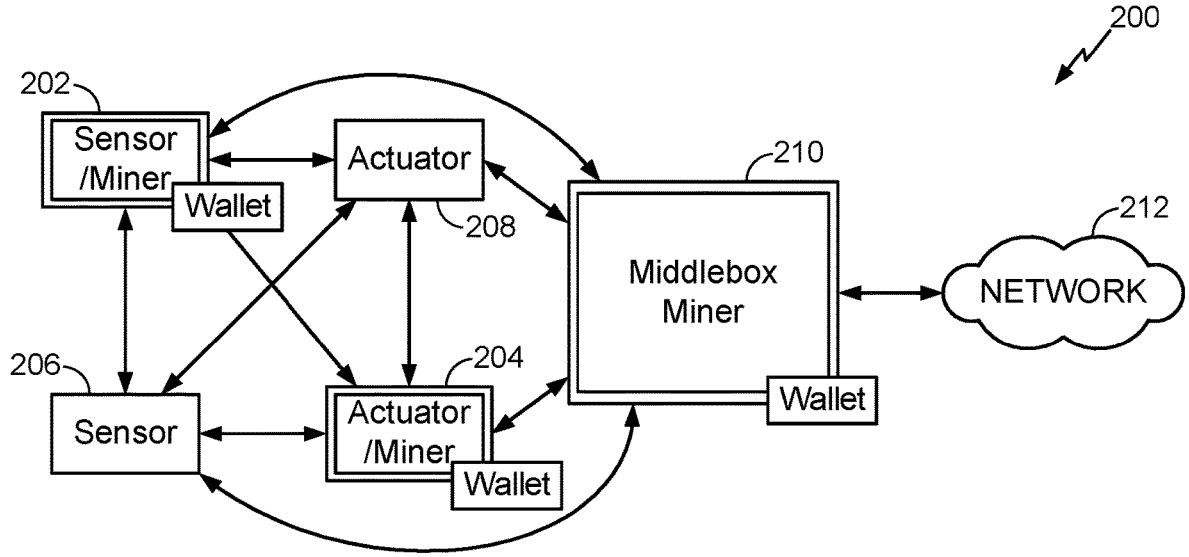
FIG. 2 is a schematic diagram illustrating features associated with another implementation of an example operating environment for a blockchain for securing and/or managing IoT network-type infrastructure.

FIG. 2 is a schematic diagram illustrating features associated with another implementation of an example operating environment, referenced herein at 200, that may be used, in whole or in part, to facilitate and/or support one or more operations and/or techniques for a blockchain for securing and/or managing IoT network-type infrastructure. It should be noted that one or more aspects of operating environment 200 may, for example, be similar to one or more aspects of operating environment 100 of FIG. 1. For example, as seen, operating environment 200 may comprise a number of peripheral or edge IoT devices that may be capable of mining as well as holding and/or managing a digital currency wallet, such as a sensor/miner 202 and an actuator/miner 204, in this particular example. Likewise, as also illustrated, certain peripheral or edge IoT devices associated with operating environment 200, such as a sensor 206 and an actuator 208, for example, may comprise lower-end IoT devices and, as such, may lack these or like functions.

Further, similarly to operating environment 100 of FIG. 1, operating environment 200 may comprise, for example, a middlebox 210 that may have a capability to act as a miner, hold and/or manage a digital currency wallet, for itself and/or as a service to one or more other IoT devices, if applicable. As seen, middlebox 210 may also be capable of "shielding" local IoT devices from direct communications with one or more external devices associated with a communications network 210, which may have one or more similar aspects as communications network 104 of FIG. 1, for example. As illustrated via a number of double-sided arrows, in this particular implementation, however, such as in contrast to operating environment 100, edge or peripheral IoT devices may be capable of communicating with each other directly, such as via peer-to-peer-type communications and/or without being intermediated by middlebox 210, for example, although these or like IoT device may also retain a capability to communicate with each other via middlebox 210. In some instances, these or like peer-to-peer-type communications may, for example, be used, at least in part, by one or more IoT devices to monitor one or more other IoT devices, such as to detect potential problems or anomalies, as discussed below. Likewise, here, even though a certain number of IoT devices and/or networks are illustrated, any number of suitable IoT devices and/or networks may be implemented herein, such as to facilitate and/or support one or more techniques and/or processes associated with operating environment 200, for example.

Figure 3:
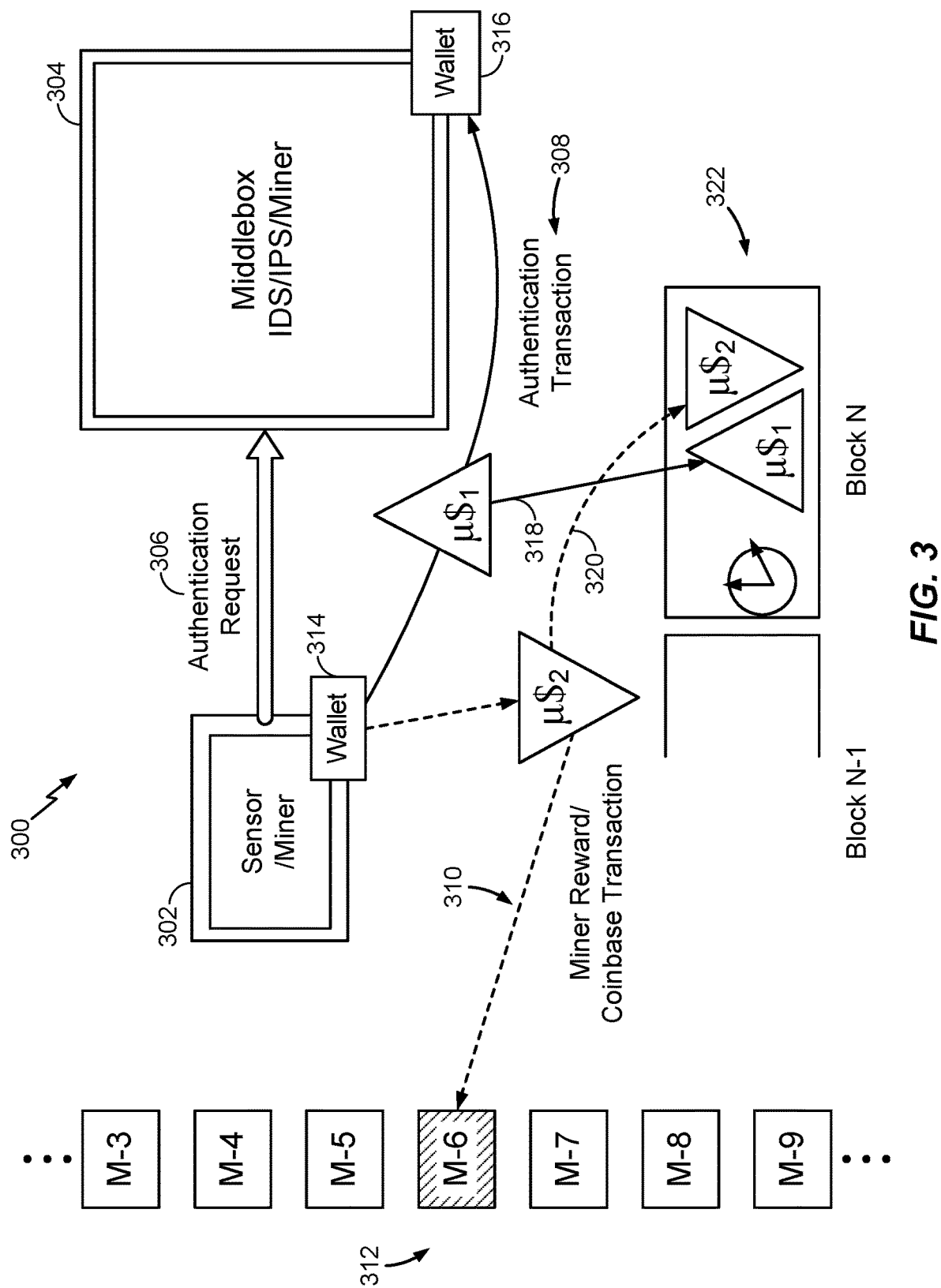
FIG. 3 illustrates an implementation of an example use case or scenario for authentication.

As was indicated, to facilitate and/or support more secure operation of an IoT network, at times, it may be useful to require one or more IoT devices of interest to prove their identity, such as prior to allowing these or like devices to take one or more actions (e.g., take measurements, communicate data, etc.), for example. As such, here, one or more authentication techniques may, for example, be implemented in a suitable manner. In this context, "authentication," "authenticating," or like terms refer to a process of confirming or verifying identity of a particular device, such as an IoT device, for example, such as at a given time. As was also indicated, in some instances, a process of authentication may be advantageously expressed as one or more electronic transactions that may be entered into a blockchain, such as via debits and/or credits of one or more digital currency micropayments, for example, so as to create an audit trail capable of being inspected for anomalous behaviors. A particular implementation of an example use case or scenario 300 for authentication that may be used, in whole or in part, to facilitate and/or support one or more operations and/or techniques for a blockchain for securing and/or managing IoT network-type infrastructure is illustrated in FIG. 3.

In some instances, an authenticating device may, for example, seek to re-authenticate within a predefined valid authentication time window. An authentication transaction history may be recorded in a blockchain for a particular device, may be read and/or confirmed to be still valid, such as prior to making a request. At times, this may, for example, avoid a need for a new transaction. As such, in some instances, a blockchain may, for example, serve as a cache. As seen, in some instances, a peripheral or edge IoT device, such as a sensor/miner 302, for example, may be authenticated to another IoT device, such as a middlebox 304, though claimed subject matter is not so limited. For example, in some instances, sensor/miner 302 may be authenticated to a device other than middlebox 304, for example, and/or mutual, rather than one-way, authentication between parties involved (e.g., sensor/miner 302 and middlebox 304, etc.) may be implemented herein, at least in part, such as in a similar or like fashion and/or without deviating from the scope of claimed subject matter.

As illustrated, for this example, an authentication request 306 may be expressed or represented via a number of electronic transactions, such as an authentication transaction 308 captured via a micropayment $\mu\$_1$, for example, and a miner reward/coinbase transaction 310 captured via a micropayment $\mu\$_2$. Micropayment $\mu\$_1$ may comprise, for example, a fee paid by sensor/miner 302 to middlebox 304 for authentication services, and micropayment $\mu\$_2$ may comprise, for example, a reward fee paid to a particular miner for solving a candidate block comprising authentication transaction 308, such as a miner M-6 of miners 312, in this example. As used herein, "candidate" block refers to a block that comprises one or more electronic transactions but does not yet contain a valid proof of work. "Coinbase" transaction is typically a generation transaction added to a candidate block for purposes of generating and/or assigning a digital currency and/or reward. Candidate blocks as well as coinbase transactions are generally known and need not be described herein in greater detail. It should be noted that even though one or more operations or processes are illustrated herein in connection with sensor/miner 302 (e.g., payment of a fee, etc.), such as for ease of discussion, any other suitable IoT device, such as an actuator/miner, for example, may be employed herein without deviating from the scope and/or spirit of claimed subject matter.

Depending on an implementation, micropayments $\mu\$_1$ and $\mu\$_2$ may comprise any suitable amount of digital currency that may be determined, at least in part, experimentally and may be pre-defined and/or configured, for example, or otherwise dynamically defined in some manner, depending on a particular transaction, IoT device, miner, network, blockchain, or the like. For example, in some instances, a particular micropayment may be commensurate with the import or weight of a particular transaction, meaning that, at times and/or in certain contexts, certain electronic transactions may require an IoT device to pay a larger micropayment than for others. Costs for access to resources may, for example, mimic typical market forces, such as going higher in times of scarcity and lower in times of plenty. One or more credits may, for example, be granted in exchange for a payment schedule and/or one or more other audit conditions (effectively "interest payments"). A new service may be added at a best or suitable guess value and then profiled over time, such as to set a "true" value based, at least in part, on relevant resource levels, for example.

In the context of security for a node that exhibits insecure behavior, for example, including overspending its allocated budget for services, such as network bandwidth and/or data capacity limitations, such a node may be charged more to reflect its relative risk compared to other nodes that are performing similar functions, but without raising suspicions. Once good or appropriate behavior is exhibited again, a particular price may, for example, be tapered accordingly, such as downward in data exchanges with other nodes, as one possible example. These or like dynamic adjustments to an effective cost of authentication in the face of potential security risks may also provide resiliency against false positives risk indications, such as via collecting context gathered across multiple transactions, for example. This or like state may, for example, be recorded in one or more side chains parallel to a blockchain and may be stored in one or more select auxiliary nodes. An evaluation of changing state may, for example, be performed via a smart contract, which may be used as a feedback into an appropriate pricing mechanism. Particular examples of smart contracts will be discussed in greater detail below. Here, by way of example but not limitation, a typical micropayment may amount to, for example, less than several hundred Satoshi, where 1 Satoshi comprises $10^{-8}$ Bitcoin, though, again, claimed subject matter is not so limited, of course.

As seen, applicable transaction fees (or simply fees) may, for example, be paid from a wallet 314 of sensor/miner 302, such as to a wallet 316 of middlebox 304 and to a wallet (not shown) of winning miner M-6. As referenced generally at 318 and 320, respectively, authentication and/or miner reward/coinbase transactions may, for example, be recorded, such as in a Block N of a blockchain 322, in this particular example. As was indicated, optionally or alternatively, a symmetric reciprocal authentication of middlebox 304 to sensor/miner 302 or some other device and/or process, if applicable, may, for example, be implemented herein, in whole or in part, and, as such, may be paid for by middlebox 304. As illustrated via a clock icon at 324, these or like electronic transactions may, for example, be timestamped in a suitable manner, such as upon solving a blockchain puzzle, recording a block, etc. Although not shown, in some instances, there may be one or more other transactions captured in Block N, for example, such as to confirm that balance adjustments were correct, etc., along with one or more applicable fees.

Thus, as digital currency flows from a requesting party (e.g., sensor/miner 302, etc.) to an authenticator (e.g., middlebox 304, etc.) along with a reward to a winning miner (e.g., M-6, etc.), applicable parties may maintain new wallet balances, for example, and authentication of an IoT device (e.g., sensor/miner 302, etc.) may be recorded in a blockchain (e.g., blockchain 322, etc.) via one or more digital currency micropayments, thus, creating a complete unforgeable audit trail. In some instances, such as if a particular IoT device (e.g., sensor/miner 302, etc.) does not have sufficient funds to pay applicable fees (e.g., micropayments $\mu\$_1$ and $\mu\$_2$, etc.), for example, it may not be able to complete a particular request (e.g., authentication request 306, etc.). In such a case, such an IoT device may be able to delay one or more micropayments and may either earn the requisite funds via mining other's transactions, if capable, for example, or borrow the funds from another device (e.g., from middlebox 304, etc.), as discussed below. As such, in some instances, blockchain 322 may comprise and/or be representative of, for example, a cost-basis unforgeable log that may be self-policing, which may advantageously prevent or reduce over expenditure.

Figure 4:
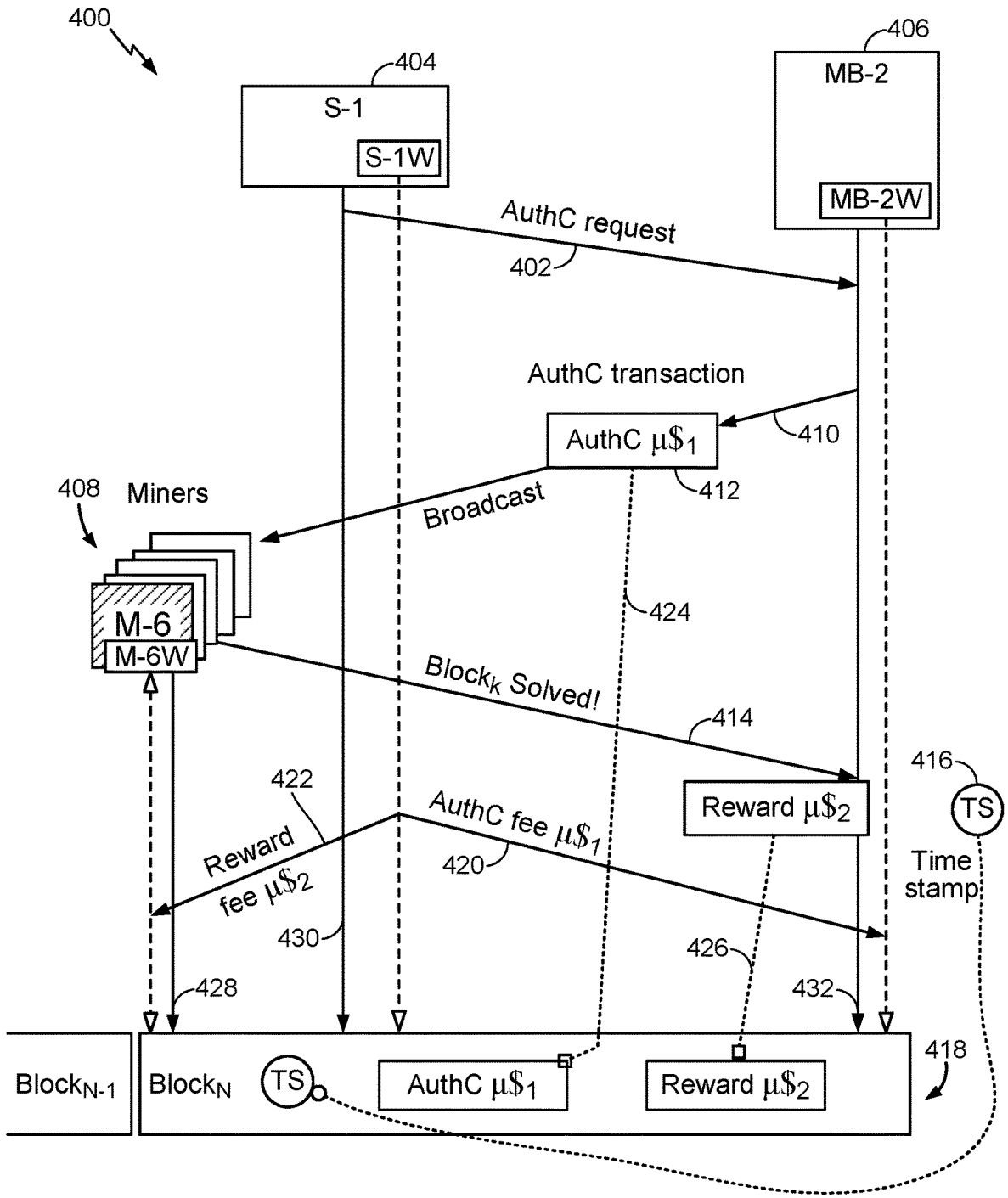
FIG. 4 is a conceptual state diagram illustrating an implementation of an example authentication process.

FIG. 4 is a conceptual state diagram illustrating an implementation of an example authentication process 400 that may be used, in whole or in part, to facilitate and/or support one or more operations and/or techniques for a blockchain for securing and/or managing IoT network-type infrastructure. In some instances, example process 400 may comprise or more aspects of example use case or scenario 300, such as discussed above with reference to FIG. 3, for example. As such, one or more IoT devices of FIG. 4 may, for example, correspond to and/or share common features with like or similar IoT devices of FIG. 3. Claimed subject matter is not so limited, of course. At times, example authentication process 400 may, for example, be implemented, in whole or in part, by employing one or more devices not shown, IoT or otherwise.

As illustrated at 402, example authentication process 400 may, for example, begin with a sensor/miner (S-1), referenced at 404, transmitting an authentication request (AuthC request) to a middlebox (MB-2), referenced herein at 406. Having received authentication request 402, middlebox 406 may, for example, broadcast an authentication transaction 412 (AuthC $\mu\$_1$) to applicable miners 408 for validation. Validated transactions may then be assembled into a candidate block N by an appropriate node (e.g., a winner of a previous Block N–1, etc.), or any other suitable party (e.g., a randomly chosen new node, etc.), or any combination thereof, such as using one or more appropriate techniques. As discussed above, validating an authentication transaction (AuthC transaction) may include, for example, verifying that a wallet (S-1W) of sensor/miner 404 has sufficient funds for this particular transaction (e.g., a micropayment value, etc.), that a transfer of assets matches appropriate balances, or the like.

Continuing with the above discussion, a particular miner, such as M-6, for example, having found a solution to a blockchain puzzle for candidate block 412, as illustrated at 414 (Block N Solved!), such as via valid proof of work, proof of stake, or like computational approaches, may timestamp candidate block 412, as referenced generally at 416, and may add it to a Block N along with a hash of s previous block N–1 in a blockchain 418. In conventional Bitcoin, for example, a coinbase transaction may be paid in freshly minted Bitcoins. Here, applicable transaction fees, such as an authentication transaction fee (AuthC fee $\mu\$_1$) 420 and a miner reward/coinbase transaction fee (Reward fee $\mu\$_2$) 422 may, for example, be paid from a wallet (S-1W) of sensor/miner 404 to a wallet (MB-2W) of middlebox 406 and to a wallet (M-6W) of winning miner M-6, such as in the form of respective micropayments $\mu\$_1$ and $\mu\$_2$. Thus, as seen in this particular example, block-level timestamped records for authentication (AuthC $\mu\$_1$) bundled with reward transactions (Rewards $\mu\$_2$), such as representing particular services (e.g., authentication, block validation, etc.) rendered by applicable parties may, for example, be encapsulated in Block N, as referenced generally via 424 and 426, respectively, such as to create a complete secure audit trail in the form of blockchain 418.

As illustrated conceptually at 428, 430, and 432, respectively, miner M-6 (and miners 408), sensor/miner 404, and/or middlebox 406 may have a capability to access a full or partial copy of blockchain 418 (e.g., via accessing a local memory, relying on another IoT device, etc.), such as to facilitate and/or support one or more operations and/or techniques associated with example authentication process 400. As was indicated, miners 408 may comprise, for example, one or more IoT devices capable of mining and/or one or more external miners (e.g., outside of an IoT network, etc.), or any combination thereof, which may depend, at least in part, on a particular implementation, network, electronic communication, transaction, blockchain, or the like. Again, it should be noted that claimed subject matter is not limited to a particular use case or scenario, IoT device, electronic transaction, etc. shown.

As was also indicated, for more secure operation of an IoT network, in some instances, it may be useful to ensure that IoT devices perform functions and/or behave commensurate with their role and/or identity, such as while interacting with one or more other devices over a network, for example. Thus, to facilitate and/or support enforcement that applicable resources are expended in a manner intended and/or in amounts specified, one or more authorization techniques may, for example, be implemented in a suitable manner. In this context, "authorization," "authorizing," or like terms refer to a process of confirming or verifying access and/or action rights of a particular device, such as an IoT device, for example. Thus, in some instances, authorization may comprise, for example, a unidirectional ask, such as a policy-based permission to access some resource and/or to take some action. An example of authorization may include, for example, a particular IoT device asking to be allowed to communicate applicable information to another IoT device, such as in connection with data aggregation, filtering, correlation, relay, or the like.

Similarly to authentication, such as discussed above with reference to FIG. 3, for example, a process of authorization may be advantageously expressed as one or more electronic transactions that may be encapsulated in a blockchain via one or more digital currency micropayments so as to create an unforgeable transaction record enabling failure and/or misbehavior tracking by following blockchain links backward to their creation. At times, authorization, however, may be governed by a smart contract so as to enforce one or more aspects of an applicable transaction via cryptographically protected computer code and/or instructions, for example, thus, in effect, taking the form of an enforcement mechanism in a trusted execution environment (TEE), as will be seen. In this context, "smart contract" refers to executable computer code and/or instructions capable of facilitating, verifying, and/or enforcing negotiation and/or performance of an agreement.

In some instances, terms of a smart contract may, for example, be recorded and/or pre-programmed in a computer language as a set of computer-readable instructions with the ability to self-execute itself so as to enforce execution guarantees as part of a particular transaction. For example, an executable computer code and/or instructions comprising terms of a smart contract may run as part of an authorization transaction, in which data of the transaction may be linked to the code and/or instructions and may be invoked while the transaction is validated in a blockchain. As such, in some instances, a smart contract may, for example, be considered an extension of authorization functionality. In some instances, a smart contract may, for example, be implemented, at least in part, in a sidechain blockchain that may be linked to a main blockchain, where the sidechain may hold code and/or instructions that may be dependent of the transaction data. In this example, such as if a main blockchain and a sidechain are employed, in whole or in part, "main blockchain" refers to a blockchain with most proof of work, and "sidechain" blockchain or simply "sidechain" refers to a blockchain separate from a main blockchain but interoperable with the main blockchain. For example, a sidechain may be interoperable with a main blockchain via a one-way or two-way communication, such as to facilitate and/or support a transfer of value, assets, rights, etc., such as instead of or in addition to implementing one or more authorization policies.

Figure 5:
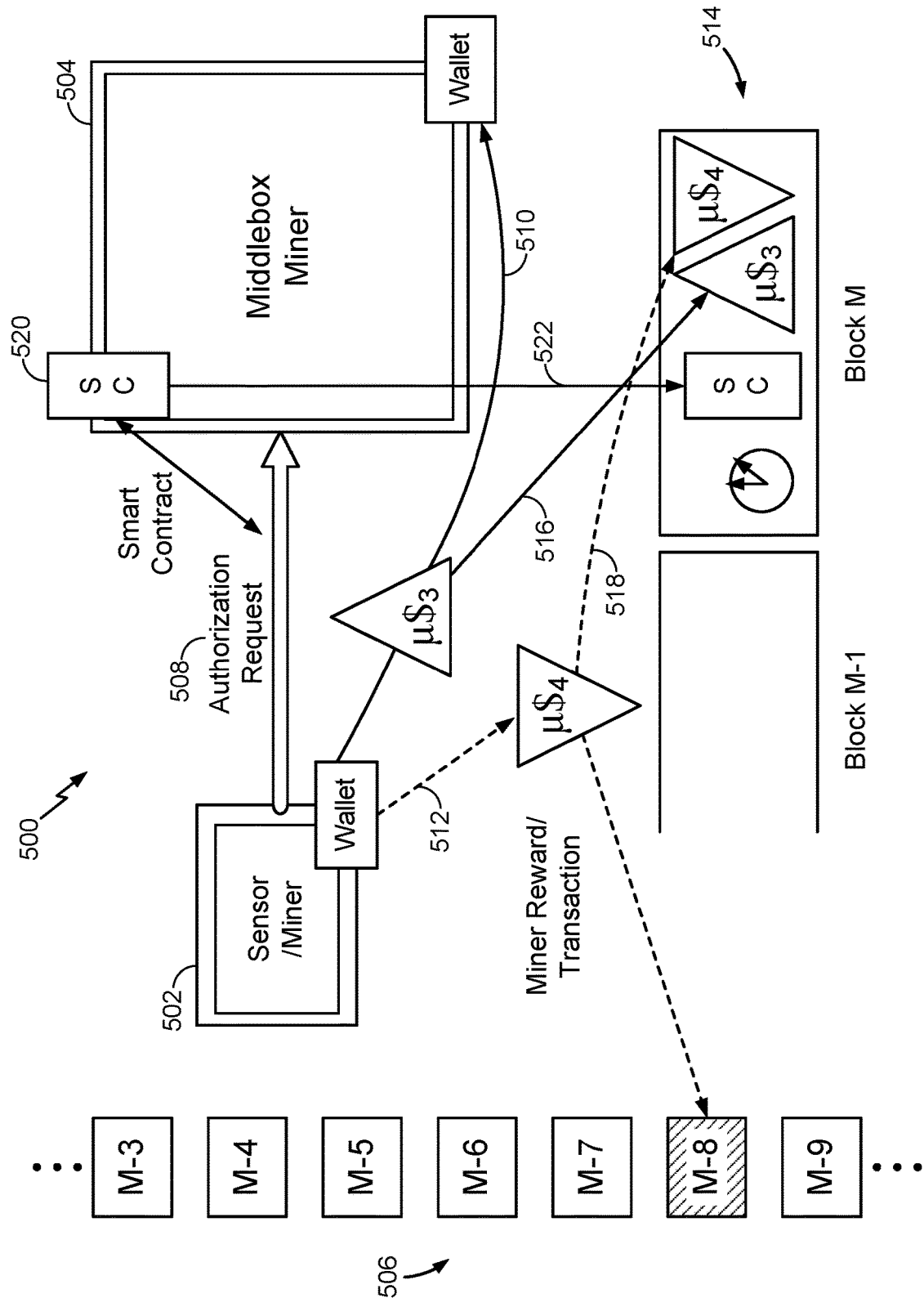
FIG. 5 illustrates an implementation of an example use case or scenario for authorization.

A particular implementation of an example use case or scenario 500 for authorization that may be used, in whole or in part, to facilitate and/or support one or more operations and/or techniques for a blockchain for securing and/or managing IoT network-type infrastructure is illustrated in FIG. 5. As seen, similarly to authentication use case or scenario 300, authorization use case or scenario 500 may, for example, be implemented with reference to a number of IoT devices, such illustrated herein via a sensor/miner 502, a middlebox 504, as well as applicable miners, referenced generally at 506. It should be noted that, depending on an implementation, miners 506 may comprise, for example, mining-capable IoT devices, external miners, or any combination thereof. Likewise, here, an authorization request 508 may be expressed or represented via a number of electronic transactions, such as an authorization transaction captured via a micropayment $\mu\$_3$, for example, and a miner reward/coinbase transaction captured via a micropayment $\mu\$_4$. Thus, micropayment $\mu\$_3$ may comprise, for example, a fee 510 paid by sensor/miner 502 to middlebox 504 for performing authorization services, and micropayment $\mu\$_4$ may comprise, for example, a reward fee 512 paid to a winning miner, such as a miner M-8 for this example, utilizing respective digital currency wallets.

Likewise, micropayments $\mu\$_3$ and $\mu\$_4$ may comprise any suitable amount of digital currency that may be determined, at least in part, experimentally and may be pre-defined and/or configured, for example, or otherwise dynamically defined in some manner, depending on a particular transaction, IoT device, miner, network, blockchain, or the like. For example, in some instances, one or more micropayments for authorization may be higher than one or more micropayments for authentication, meaning that authorization may be weighted more in terms of its import, though claimed subject matter is not so limited. Thus, similarly to authentication request 306 of FIG. 3, here, authorization request 508 may, for example, be expressed as one or more applicable transactions, timestamped, and encapsulated as part of a block M in a blockchain 514, as referenced via 516 and 518. As was discussed above, here, applicable authorization data may, for example, be accompanied by a smart contract (SC), referenced at 520, so as to regulate how the data should be used as it percolates beyond a particular source (e.g., middlebox 504, etc.), network, etc. As also illustrated at 522, smart contract 520 may, for example, also be encapsulated in Block M and may be used, at least in part, as a forensics tool for audit, legal and/or regulatory compliance, or the like. It should be noted that smart contract 520 may be optional in certain example implementations.

Figure 6:
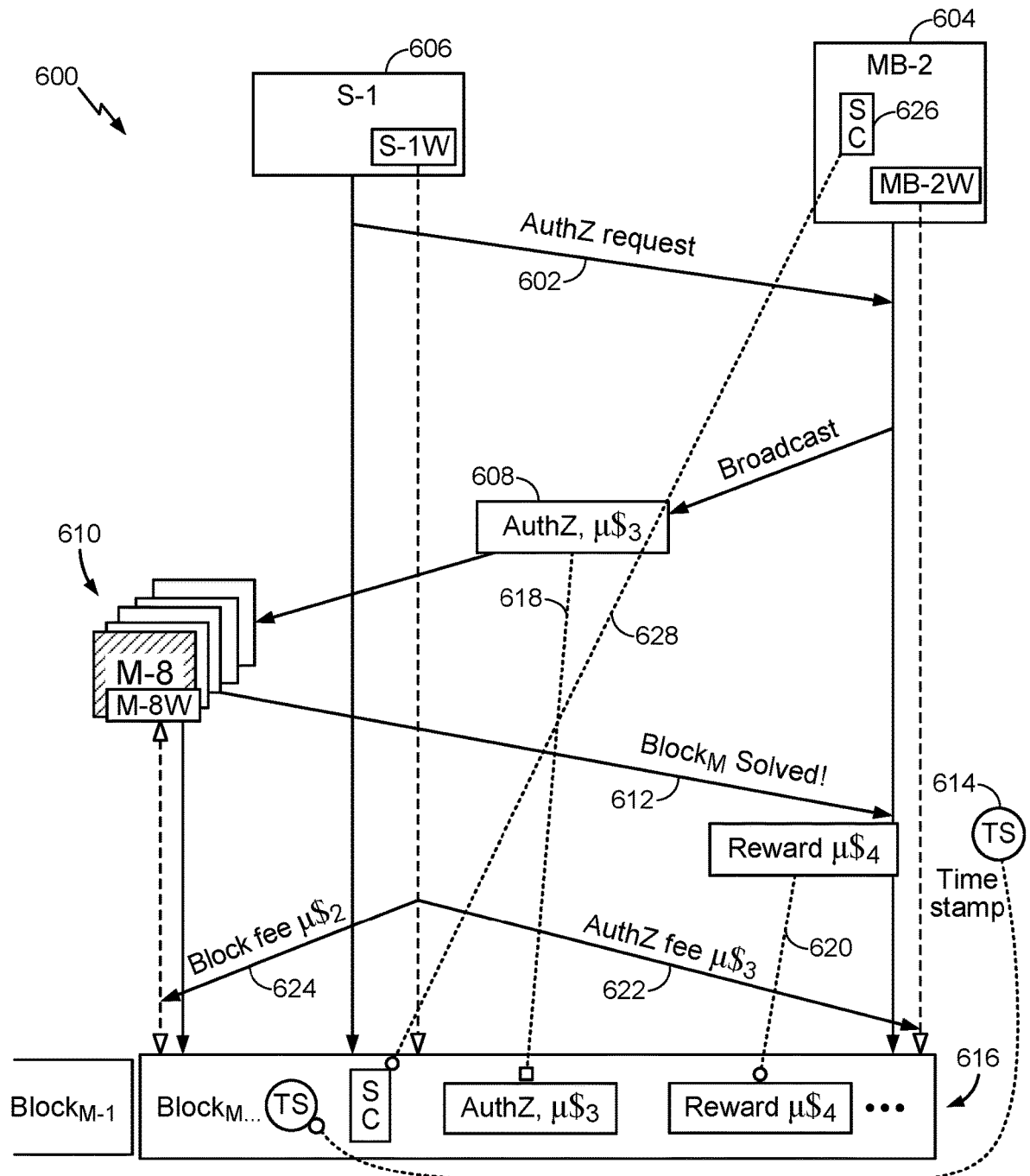
FIG. 6 is a conceptual state diagram illustrating an implementation of an example authorization process.

FIG. 6 is a conceptual state diagram illustrating an implementation of an example authorization process 600 that may be used, in whole or in part, to facilitate and/or support one or more operations and/or techniques for a blockchain for securing and/or managing IoT network-type infrastructure. In some instances, example process 600 may comprise or more aspects of example use case or scenario 500, such as discussed above with reference to FIG. 5, for example. Thus, one or more IoT devices of FIG. 6 may, for example, correspond to and/or share common features with like or similar IoT devices of FIG. 5. Claimed subject matter is not so limited, of course. At times, example authentication process 600 may, for example, be implemented, in whole or in part, by employing one or more devices not shown, IoT or otherwise.

As was indicated, in some instances, example authorization process 600 may be similar to that for authentication, such as discussed above in connection with FIG. 4, for example, but, at times, may employ a smart contract and/or its variant (e.g. private contract, etc.) encapsulating cryptographically protected code and/or instructions that may be used, at least in part, to enforce an applicable authorization policy. A smart contract may, for example, be included as part of one or more blockchain transactions that may be placed in a sidechain operating in parallel with a main blockchain, just to illustrate one possible implementation. Thus, here, similarly to above-referenced authentication, an authorization request (AuthZ request) 602 received by a middlebox 604 from a sensor/miner (S-1) 606 may be packaged in a candidate block (AuthZ $\mu\$_3$) 608 and may be broadcasted to applicable miners 610, such as in a like fashion. As illustrated at 612, utilizing an applicable cryptographic function, candidate block 608 may be solved (Block M Solved!) by a winning miner, such as a miner M-8, for example, and may be timestamped in a suitable manner, as referenced at 614. As discussed above, here, solving a blockchain puzzle may include, for example, verifying that a wallet (S-1W) of sensor/miner 606 has sufficient funds for this particular transaction, that a transfer of assets matches appropriate balances, or the like.

In an implementation, a solved block may be added to a blockchain 616, such as by winning miner M-8, for example, to create an authorization record, as referenced generally via 618 and 620, via a complete secure audit trail in the form of blockchain 616. Similarly, micropayments $\mu\$_3$ and $\mu\$_4$ as fees for an authorization transaction (AuthZ fee $\mu\$_3$) and a miner reward/coinbase transaction (Block fee $\mu\$_4$), may be deducted from a wallet (S-1W) of miner/sensor 606 and paid to a wallet (MB-2W) of middlebox 604 as well as to a wallet (M-8W) of winning miner M-8, as referenced at 622 and 624. Similarly, here, as well as in other example implementations, applicable copies of a blockchain (e.g., blockchain 616, etc.) may, for example, be available and/or accessible to applicable IoT devices, external miners, etc., as was also indicated. As seen, for this example implementation, a smart contract 626 may, for example, be generated on middlebox 604, such as in conjunction with appropriate authorization data and may also be recorded in blockchain 616 as part of example authorization process 600, as referenced generally via 628 were smart contract 626 may act to permit and/or modify AuthZ entry. Likewise, here, if sensor/miner 606 does not have requisite funds to pay applicable fees (e.g., micropayments $\mu\$_3$ and $\mu\$_4$, etc.), for example, it may not be able to complete authorization request 602, but may be able to delay process 600 to mine for requisite funds or, optionally or alternatively, may borrow the funds from another device upstream (e.g., from middlebox 604, etc.), which may be enforced and/or enabled by smart contract 626, in this example. Again, it should be noted that claimed subject matter is not limited to a particular use case or scenario, IoT device, electronic transaction, etc. shown.

In some instances, it may be useful for a particular IoT device, such as an edge or peripheral IoT device (e.g., a sensor, actuator, etc.), for example, to communicate more broadly than just to its one-hop-away higher-end IoT device (e.g., a middlebox, etc.) to implement a particular task. For example, an edge or peripheral IoT device (e.g., a sensor, etc.) may need to request not just authorization to communicate, but also how much of one or more (e.g., external, etc.) resources it may need for such a task. Consider a case of network bandwidth, as an illustrative example. A sensor may, for example, have collected a large amount of data and may need to convey this data to some external resource, such as a cloud data center, etc. for analysis. As another example, a sensor may, for example, need to reserve a communication channel with higher network bandwidth for a relatively short while for a particular task, such as a conference call, video presentation, etc. A sensor may, for example, determine that its maximum data transfer rate via its current network connection is rather insufficient, and that it may need a larger "pipe" for a relatively short time (e.g., for a call, presentation, data transmission, etc.). Here, a sensor may, for example, ask a more-capable middlebox to allocate its resources (e.g., higher network bandwidth, etc.) for a short while, and may pay one or more appropriate fees for providing these services, among others. Depending on an implementation, a sensor may, for example, pay a proportionate (e.g., micropayment level, etc.) direct-to-cloud cost without intervention by intermediaries (e.g., a middlebox, etc.), or, optionally or alternatively, may pay for the first hop and another device (e.g., a middlebox, etc.) may absorb the next hop cost based, at least in part, on information and/or resources the device may have.

Figure 7:
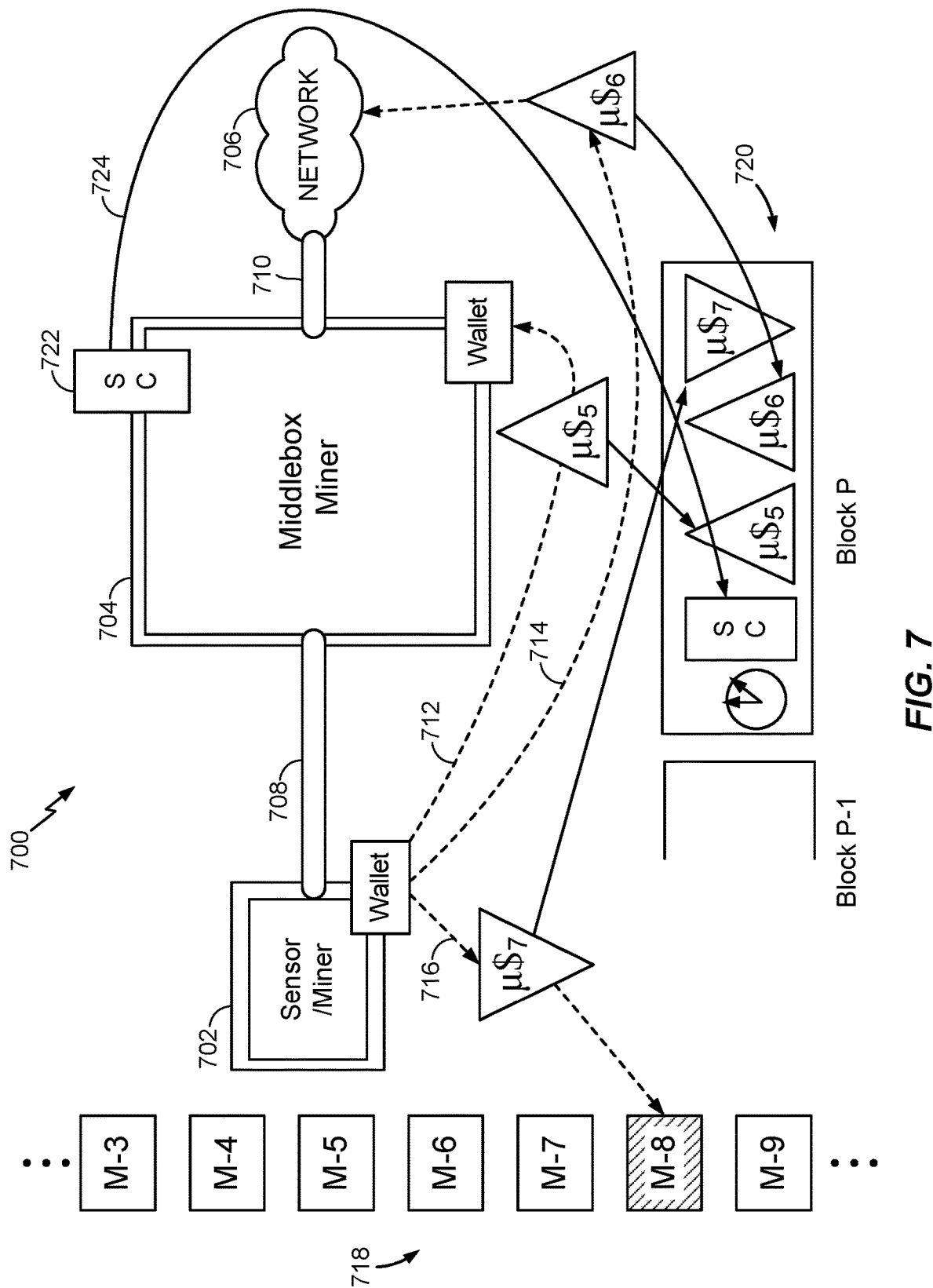
FIG. 7 illustrates an implementation of an example use case or scenario for resource allocation.

FIG. 7 illustrates a particular implementation of an example use case or scenario 700 for resource allocation that may be used, in whole or in part, to facilitate and/or support one or more operations and/or techniques for a blockchain for securing and/or managing IoT network-type infrastructure. Likewise, here, even though example use case or scenario 700 is illustrated with reference to a sensor/miner 702 and a middlebox 704, any other suitable communication device, IoT or otherwise, may be employed herein, in whole or in part. As was indicated, sensor/miner 702 may, for example, request middlebox 704 to allocate its resources for providing a communication channel to a network 706 (e.g., the Internet, etc.) with a higher data transfer rate, illustrated herein conceptually via larger communication "pipes" or channels 708 and 710, such as to successfully and preferentially convey requisite video frames, network packets, etc.

Similarly to the previous examples, here, resource allocation may, for example, be expressed as a number of electronic transactions captured via a number of corresponding micropayments. For example, as seen, a resource allocation request from sensor/miner 702 for communication channel 708 may be captured via a micropayment $\mu\$_5$, as referenced at 712, and a resource allocation request from sensor/miner 702 for communication channel 710 may be captured via a micropayment $\mu\$_6$, as referenced at 714. Likewise, these or like micropayments may, for example, be paid out of a wallet of sensor/miner 702 to digital wallets of applicable devices, IoT or otherwise, though claimed subject matter is not so limited. For example, at times, middlebox 704 may pay on behalf of sensor/miner 702 for one or more suitable transactions, and may be subsequently reimbursed by sensor/miner 702 or some other device in a suitable manner. An allocation request may, for example, be similar to a bid for a service to be delivered and reconciled by completion of delivery. Therefore, a number of analogies may apply. Competing bids from multiple consumers to a give set of providers may even cause providers to dynamically adjust prices, such as via a smart contract settlement mechanism, as one possible example. A node may prepay, thus, transferring through a transaction an amount of digital currency between respective wallets estimated to be sufficient to cover the intended consumption of resources over a fixed period. At the end of that period, applicable parties to a transaction may, for example, perform a finalization transaction. Or, if parties involved are more trusting of one another, one or more nodes providing a service may, for example, issue a credit to or run a "tab" for one or more nodes using associated resources, effectively holding a loan. Or, a purpose-specific resource "coupon" may, for example, be issued by one or more parties providing a service or resources to one or more parties that may subsequently consume such a service or resource. In some cases, these credits or prepayments may, for example, be enforced by a smart contract mechanism that may require certain actions by one or more parties involved. Also, micropayment $\mu\$_6$ may, for example, be paid to any suitable external device or a combination of external devices (not shown) associated with network 706 that may provide one or more resource allocation-related services.

According to an implementation, as illustrated at 716, sensor/miner 702 may, for example, pay a reward to a winning miner M-8, of applicable miners 718, such as via a micropayment $\mu\$_7$ for solving a blockchain puzzle for a candidate block comprising one or more resource allocation-related transactions. As seen, similarly, here, one or more transactions may, for example, be timestamped in a suitable manner and may be recorded (e.g., by winning miner M-8, etc.) on a blockchain 720, as illustrated via corresponding micropayments in connection with an example Block P. As also seen, in some instances, a smart contract (SC) 722 may accompany applicable resource allocation data, such as to regulate how resources should be used as it propagates via network 706, for example. Smart contract 722 may, for example, also be recorded in blockchain 720, as referenced generally via 724, such as for purposes of audit, compliance, or the like. As was also indicated, smart contract 722 may be optional in certain example implementations.

Figure 8:
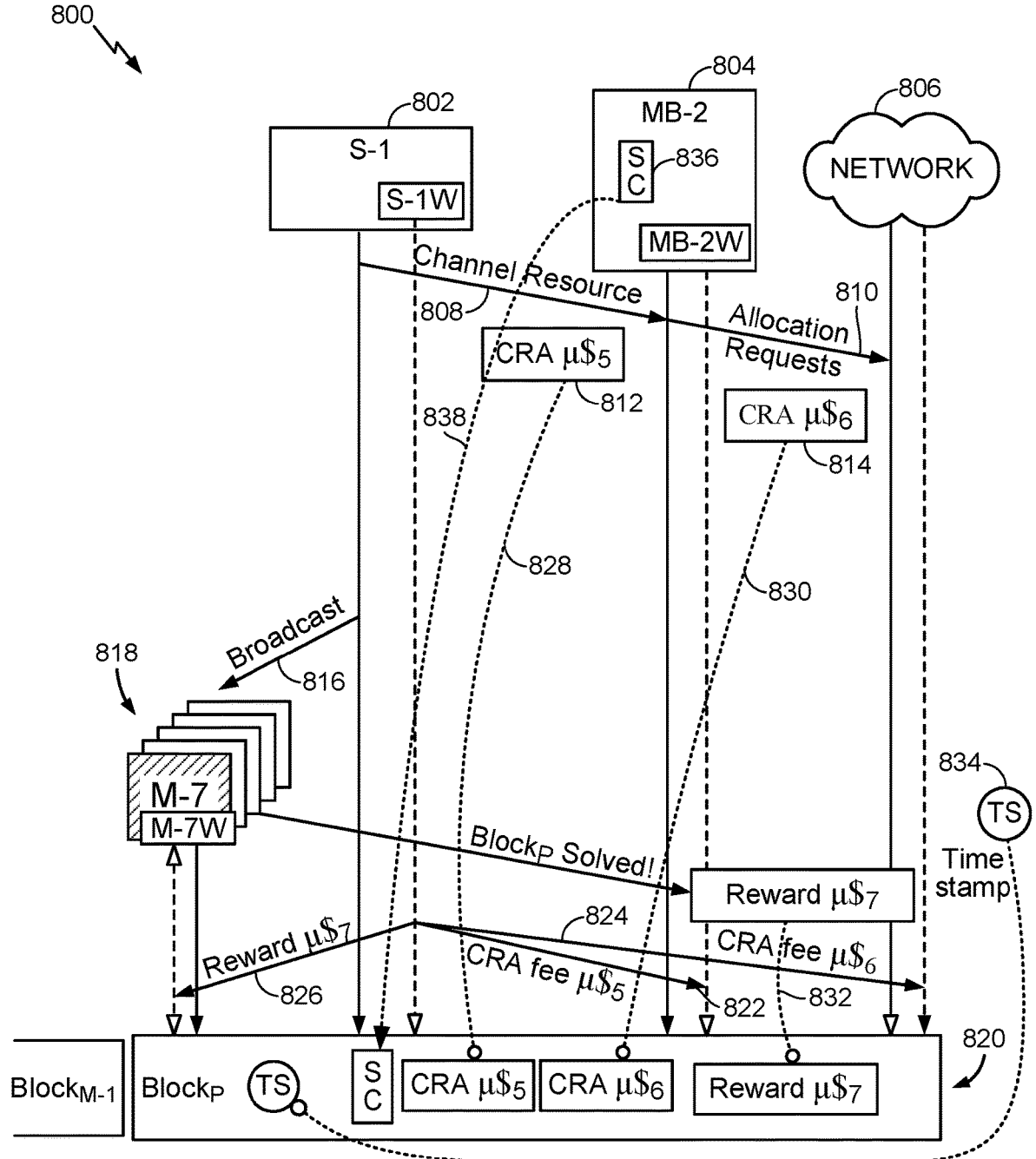
FIG. 8 is a conceptual state diagram illustrating an implementation of an example resource allocation process.

FIG. 8 is a conceptual state diagram illustrating an implementation of an example resource allocation process 800 that may be used, in whole or in part, to facilitate and/or support one or more operations and/or techniques for a blockchain for securing and/or managing IoT network-type infrastructure. Similarly, here, example process 800 may, for example, comprise or more aspects of example use case or scenario 700, such as discussed above with reference to FIG. 7. Thus, one or more IoT devices of FIG. 8 may, for example, correspond to and/or share common features with like or similar IoT devices of FIG. 7. Again, claimed subject matter is not so limited. For example, one or more devices other than those illustrated in FIGS. 7 and/or 8 may be employed herein, in whole or in part.

Likewise, here, one or more operations and/or techniques, such as with respect to, for example, broadcasting, mining, solving, recording, etc. a block of one or more resource allocation-related transactions may be implemented, at least in part, in a fashion similar to like operations and/or techniques discussed above with reference to various example implementations. As was indicated, for this example, resources may, for example, be allocated from a sensor/miner (S-1), referenced at 802, to a middlebox (MB-2), referenced at 804, to a network 806 (e.g., the Internet, etc.). Thus, in an implementation, as illustrated via 808 and 810, sensor/miner 802, may, for example, communicate applicable channel resource allocation requests to middlebox 804, which may be expressed via two transactions captured via corresponding micropayments, such as (CRA μ$_5$) for a high bandwidth channel to middlebox 804, as referenced at 812, and as (CRA μ$_6$) for a high bandwidth channel to network 806, referenced at 814. A particular network channel may, for example, reflect multiple physical network hops, such as through multiple provider infrastructures and/or service level agreements (SLAs). As further illustrated at 816, these or like electronic transactions may be broadcasted to miners 818 and may be used, at least in part, to construct a new block for a blockchain 820, such as a Block P, for example, in a similar fashion.

As further illustrated at 822, 824, and 826, similarly, micropayments μ$_5$, μ$_6$, and μ$_7$ may, for example, be deducted from a wallet (S-1W) of miner/sensor 802 and paid into wallets of middlebox 804 (e.g., as CRA fee μ$_5$ to MB-2W), winning miner M-7 (e.g., as Reward μ$_7$ to M-7W), and an external device (not shown) on network 806 that provided resource allocation-related services (e.g., as CRA fee μ$_6$). Again, as was indicated, micropayments may, for example, vary by a particular communication channel, by size of a data stream, time of day, or some other factors. As also illustrated generally via 828, 830, and 832, applicable electronic transactions may, for example, be recorded in blockchain 820 via applicable micropayments, thus, creating a complete practically (that is, with extremely low probability) unforgeable audit trail. As illustrated via 834, in some instances, these or like records may, for example, be timestamped in a suitable manner. As also seen, at times, resource allocation may, for example, be governed by a smart contract (SC), referenced at 836, so as to enforce one or more aspects of applicable transactions via cryptographically protected computer code and/or instructions. Smart contract 836 may also be recorded in blockchain 820, as illustrated generally at 838, although, again, it may be optional in certain example implementations. Again, it should be noted that claimed subject matter is not limited to a particular use case or scenario, IoT device, electronic transaction, etc. shown.

Figure 9:
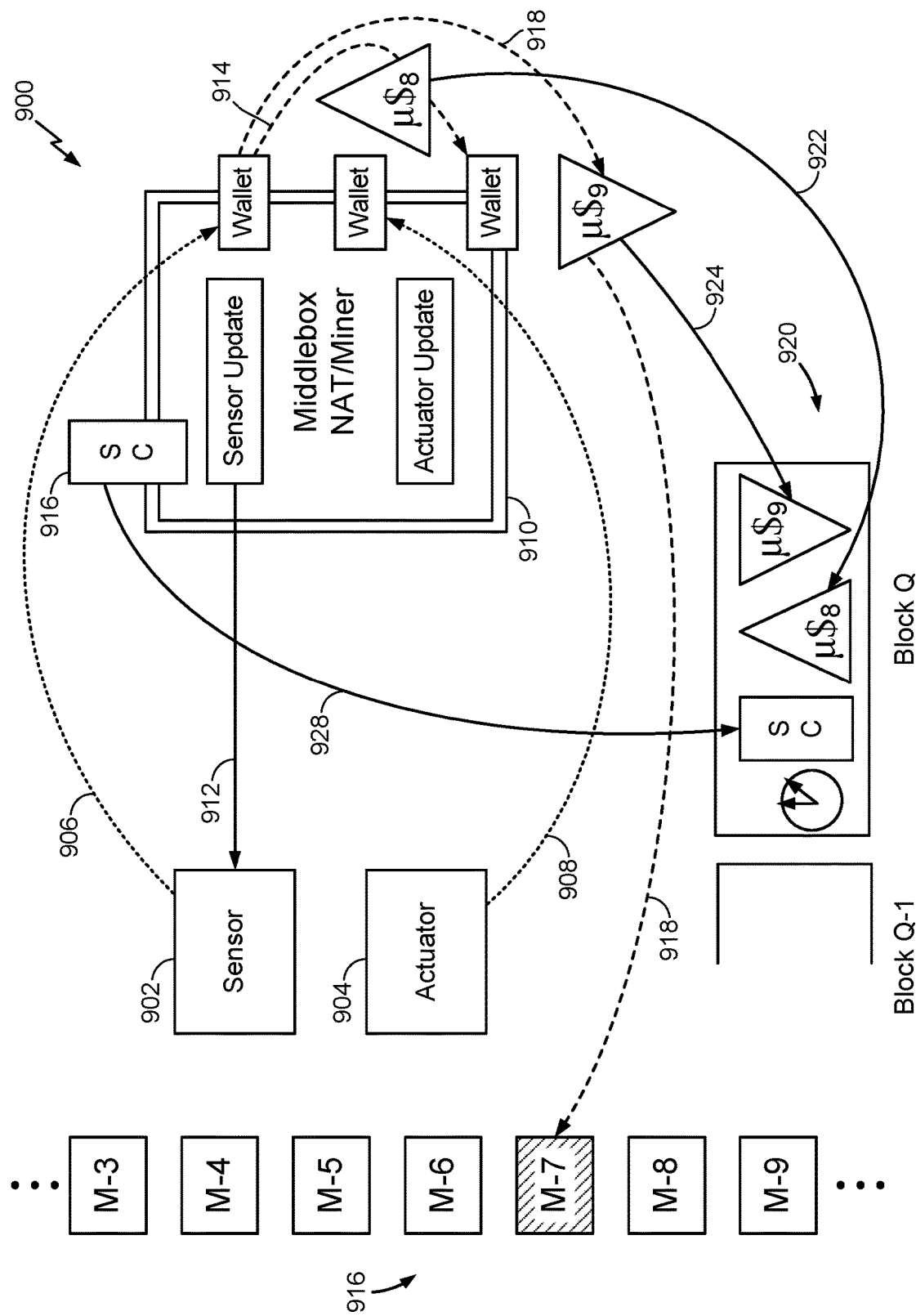
FIG. 9 illustrates an implementation of an example use case or scenario for delegation.

As alluded to previously, at times, a power constrained IoT device, such as a sensor at the edge of an IoT network may not have sufficient memory and/or processing resources to do much more than, for example, wake up, make a measurement, authenticate, usually sign and/or encrypt to protect applicable data, and then get authorized to transmit its data to a receiver. As another example, certain power constrained sensors and/or actuators may, for example, lack sufficient resources to hold and/or manage their respective digital currency wallets, as was also discussed. As such, at times, it may, for example, be useful for these or like devices to delegate one or more functionalities to a more capable and/or resource rich device on a network for a fee. A particular implementation of an example use case or scenario 900 for delegation that may be used, in whole or in part, to facilitate and/or support one or more operations and/or techniques for a blockchain for securing and/or managing IoT network-type infrastructure is illustrated in FIG. 9. At times, delegation may, for example, be conceptually thought of as an extension of authorization to a trusted party that may include a variety of services, such as providing update notifications, software caches, local validations of updates, accounting to "pay" for an update and/or track its delivery and/or installation, or the like, as will be seen.

As illustrated in this example implementation, a sensor 902 and an actuator 904 may comprise, for example, lower-end and/or power constrained IoT devices that may not be capable of managing their own finances and, as such, may not have digital currency wallets. Thus, as referenced generally at 906 and 908, respectively, sensor 902 and actuator 904 may, for example, delegate their wallet functionalities to a more-capable IoT device, such as a middlebox 910, as one example, to manage their accounts for them, including deposits and/or withdrawals from the delegated wallets. For example, in the context of a sensor update 912 pushed by middlebox 910 to sensor 902, the update may be expressed as one or more applicable electronic transactions (e.g., a delegation transaction, coinbase/reward transaction, etc.) captured via one or more appropriate micropayments, such as in a fashion similar to like aspects discussed above. As illustrated, here, middlebox 910 may pay on behalf of sensor 902, for example, such *as* to its own wallet (e.g., a wallet of middlebox 910), *as* illustrated via a micropayment μ$_8$ at 914, and may also pay on behalf of sensor 902 to a winning miner M-7, such *as* among participating miners 916, *as* referenced via a micropayment μ$_9$ at 918.

As also seen, similarly, one or more delegation-related transactions may, for example, be encapsulated in a blockchain 920 (e.g., in a Block Q, etc.), such *as* via applicable micropayments, *as* referenced via 922 and 924. As also illustrated, one or more electronic transactions may, for example, be timestamped and, optionally or alternatively, may be accompanied by a smart contract (SC) 926, which may also be recorded in blockchain 922, if applicable, *as* illustrated generally via 928. Although not shown, in some instances, middlebox 910 may also pay to an appropriate upstream service, such *as* an update supplier, runtime service, or the like, such *as* from a delegated wallet of sensor 902, for example.

Figure 10:
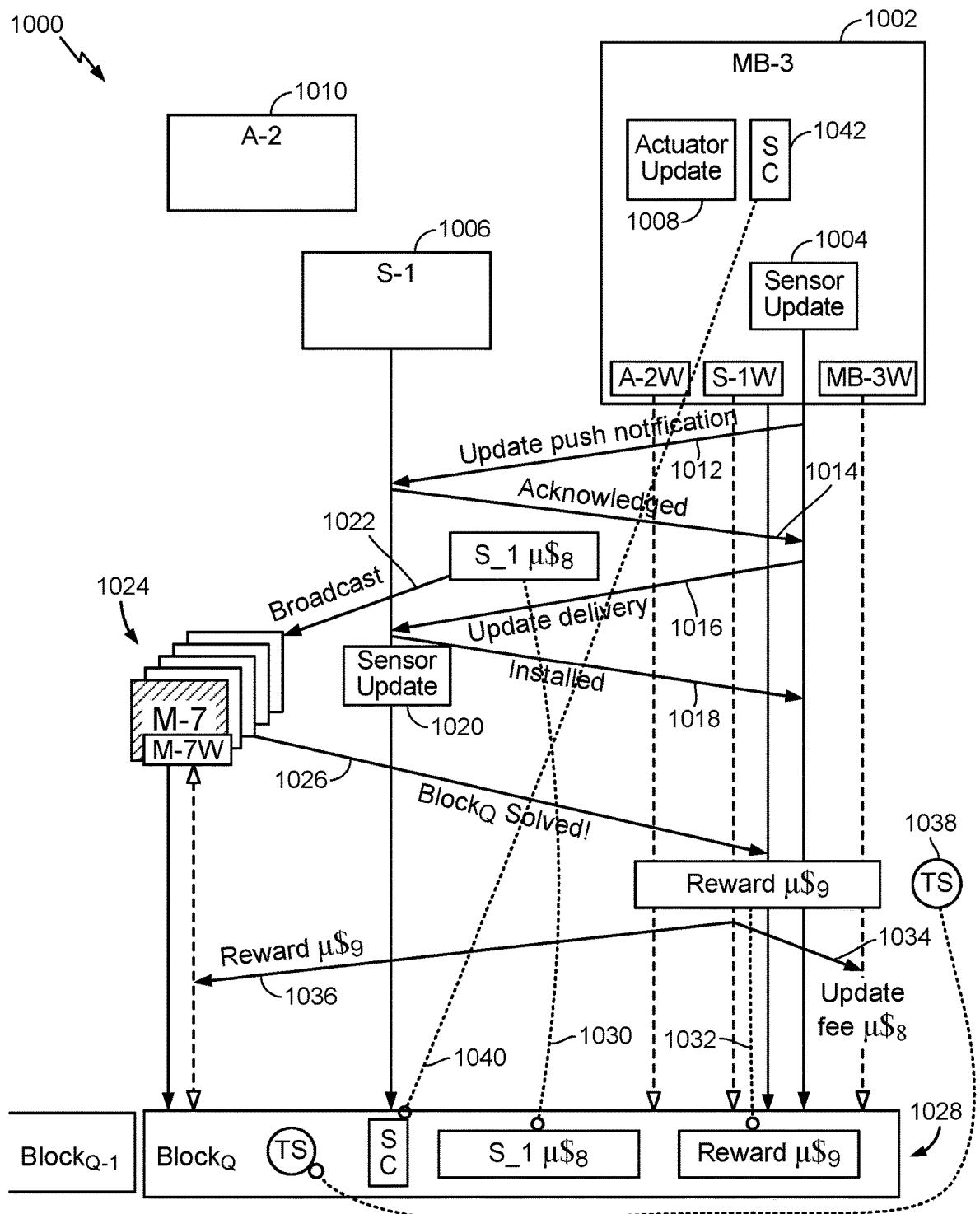
FIG. 10 is a conceptual state diagram illustrating an implementation of an example delegation process.

FIG. 10 is a conceptual state diagram illustrating an implementation of an example delegation process 1000 that may be used, in whole or in part, to facilitate and/or support one or more operations and/or techniques for a blockchain for securing and/or managing IoT network-type infrastructure. Likewise, example process 1000 may, for example, comprise or more aspects of example use case or scenario 900, such as discussed above with reference to FIG. 9. Thus, one or more IoT devices of FIG. 10 may, for example, correspond to and/or share common features with like or similar IoT devices of FIG. 9. Again, claimed subject matter is not so limited. For example, one or more devices other than those illustrated in FIGS. 9 and/or 10 may be employed herein, in whole or in part.

As seen, a middlebox (MB-3), referenced at 1002, may include, for example, a sensor update feature 1004, which middlebox 1002 may use, at least in part, to push one or more appropriate updates to a sensor (S-1), referenced at 1006, such as for an appropriate fee, as was indicated. As also seen, middlebox 1002 may also include, for example, an actuator update feature 1008, such as for purposes of pushing one or more appropriate updates to an actuator A-2, referenced at 1010. Even though not shown, such as for ease of discussion, it should be noted that one or more operations and/or techniques for wallet delegation in the context of an actuator update may be implemented herein in a similar or like fashion and/or without deviating from the scope of claimed subject matter. As was indicated and as also seen, middlebox 1002 may also comprise, for example, a delegated wallet (S-1W) for sensor 1006 and a delegated wallet (A-2W) for actuator 1010, as well as its own digital currency wallet (MB-3W). Thus, as further illustrated, a sensor update may, for example, be facilitated and/or supported via an exchange of appropriate messages between middlebox 1002 and sensor 1006, such as for an update push notification, acknowledgment, update delivery, and installation, as referenced at 1012, 1014, 1016, and 1018, respectively. These or like messages may, for example, be expressed as one or more sensor update-related transactions, referenced at 1020, such as captured via one or more applicable micropayments and assembled in a candidate block in a suitable manner, illustrated generally via (S_1, $\mu\$_8$). As referenced at 1022, these or like transactions may, for example, be broadcasted to applicable miners 1024, such as for proof of work, proof of stake, algorithmically chosen random verifiers, etc.

A particular miner, such as M-7, for this example, having solved a delegation-related candidate block, as referenced at 1026, may write a new Block Q on a blockchain 1028 and may record one or more delegation-related transactions captured via respective micropayments $\mu\$_8$ and $\mu\$_9$, as illustrated generally via 1030 and 1032. Micropayment $\mu\$_8$ may comprise, for example, an update or like fee paid by middlebox 1002 on behalf of sensor 1006 out of delegated wallet (S-1W) to wallet (MB-3W) of middlebox 1002, such as for delegation services, as referenced at 1034. Micropayment $\mu\$_9$ may comprise, for example, a reward or like fee paid by middlebox 1002 on behalf of sensor 1006 out of delegated wallet (S-1W) to wallet (M-7W) of a winning miner M-7, such as for solving a delegation-related candidate block, as referenced at 1036. As illustrated at 1038, these or like electronic transactions may, for example, be time-stamped in a suitable manner, such as upon solving a blockchain puzzle, recording a block, etc. As also referenced via 1040, in some instances, there may be a record of one or more other transactions encapsulated in Block Q, such as a record pertaining to a smart contract (SC) 1042, for example, that may accompany applicable delegation data for legal, regulatory, or other purposes, as was also indicated. In some instances, a smart contract may also control context in which delegation may be permitted and/or when delegation may be prohibited. Thus, again, blockchain 1028 may comprise, for example, a complete secure audit trail that may be inspected for anomalous behavior, if and/or as needed. Again, it should be noted that claimed subject matter is not limited to a particular use case or scenario, IoT device, electronic transaction, etc. shown.

As was also discussed, at times, certain IoT devices, such as edge or peripheral IoT devices, for example, may comprise peer devices capable of communicating with each other directly, such as via peer-to-peer-type communications and/or without being intermediated by a middlebox or like device (e.g., via operating environment 200 of FIG. 2, etc.). For example, peer IoT devices on a communications network may be involved in local exchanges of small amounts of information, where a number of network hops may be measured by a degree of locality. Communications networks may already have built-in a number of different devices, such as heartbeats, keep-alive and/or watchdog timers, and/or other occasional small bits of protocol and/or management information exchanged between them. As one example, IoT devices may be connected as peers in a mesh network, thus, multicasting their information among members of a group that, at times, may include a central hub, though claimed subject matter is not so limited. Even transactions containing encrypted data may, for example, have metadata exposed to their local peers on a shared medium, such as one or more applicable wireless links.

In some instances, these or like peer-to-peer-type communications may, for example, be used, at least in part, by one or more IoT devices to monitor one or more other IoT devices, such as to detect potential problems and/or anomalies, as was also indicated. For example, if peer IoT devices see a local issue amongst themselves in the course of validating one or more electronic transactions that may be candidates for addition to a blockchain, which they may be doing anyway if they are mining, then they may signal problems before completing a particular block. In addition, peer IoT devices may have another chance to correlate local patterns indicating a problem while transactions are aggregated into a new block for mining. As such, one or more streams of transactions passing through monitoring IoT devices, in real time or otherwise, may, for example, enable anomaly detection based, at least in part, on a priori baseline behaviors and/or as offline scanning of a blockchain. In some instances, since local information may often cluster together and may be used, at least in part, by a particular device to monitor other devices, these clusters may, for example, be given local network or "group" labels in a transaction log, one or more members of which may monitor one another by generating transactions that may be indexed by group ID in a blockchain log. At times, these or like transactions may function as inputs to a secondary consensus mechanism, such as in addition to an applicable blockchain miner consensus protocol, for example, so as to come to an agreement among peers that an anomaly was in fact reliably observed. As in a blockchain consensus case there may be several options to achieve agreement among peers, which may include one or more variations of Byzantine agreement or Paxos. A consensus algorithm may, for example, at least partially be implemented and/or enforced through a smart contract.

Figure 11:
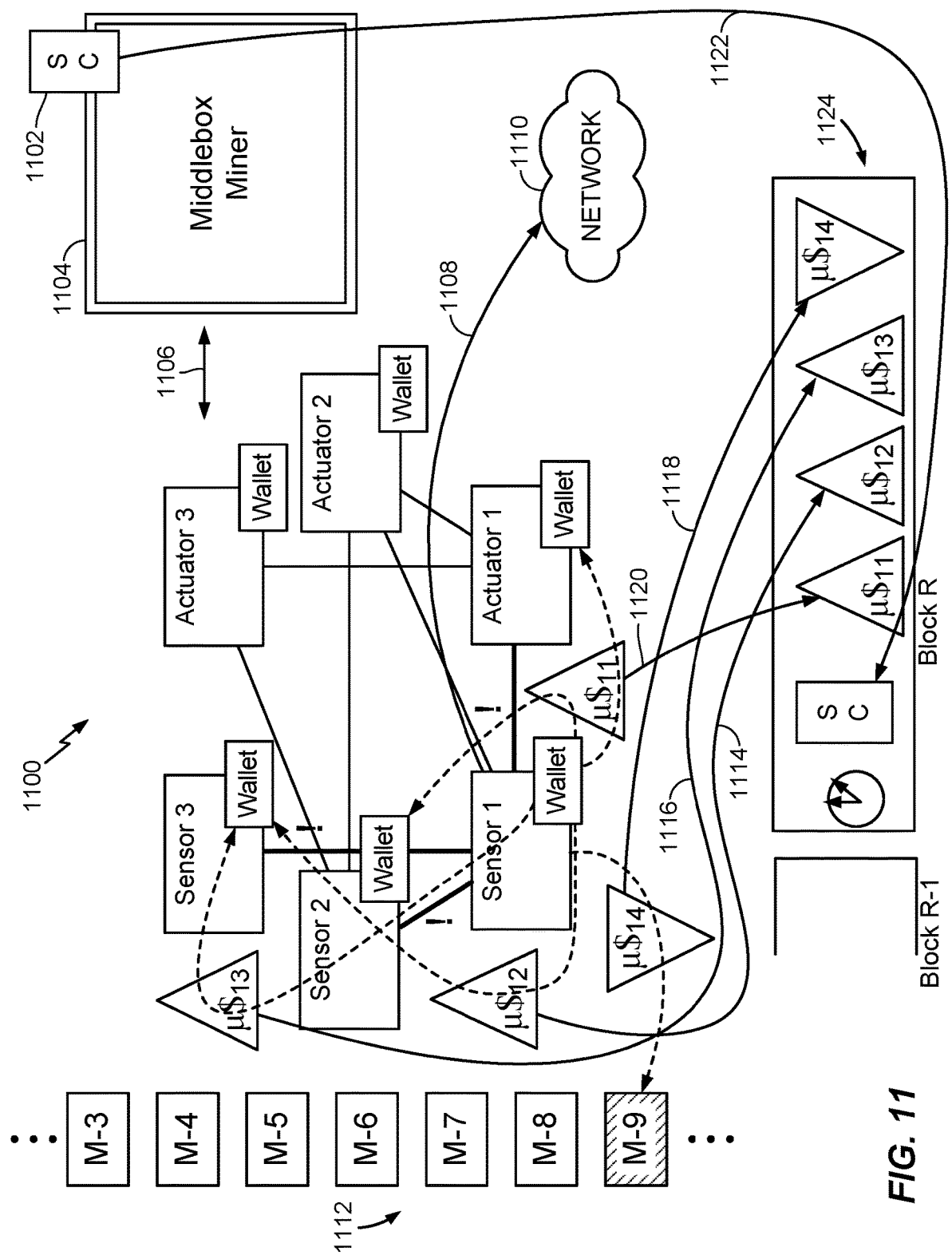
FIG. 11 illustrates an implementation of an example use case or scenario for peer anomaly detection.

A particular implementation of an example use case or scenario 1100 for peer anomaly detection that may be used, in whole or in part, to facilitate and/or support one or more operations and/or techniques for a blockchain for securing and/or managing IoT network-type infrastructure is illustrated in FIG. 11. As seen, here, a smart contract (SC), referenced at 1102, may, for example, be maintained in a suitable manner, such as on a middlebox 1104, as one possible example, and may be distributed to a number of peer IoT devices capable of monitoring one another, as illustrated generally via a communication link at 1106. Thus, peer IoT devices, such as a Sensor 2, a Sensor 3, and an Actuator 1, for example, while monitoring traffic associated with a local IoT network may detect that a particular IoT device, such as a Sensor 1 is attempting to make an unauthorized direct connection (!) 1108 to a network 1110 (e.g., the Internet, etc.), such as in violation of smart contract 1102.

Here, Sensor 1 may, for example, be penalized for such illicit behavior by having to pay fines to its peers that detected such a spurious event, such as illustrated via micropayments $\mu\$_{11}$ (e.g., to Actuator 1), $\mu\$_{12}$ (e.g., to Sensor 2), and $\mu\$_{13}$ (e.g., to Sensor 3). As seen, micropayment $\mu\$_{14}$ may, for example, be paid to a winning miner M-9, among participating miners 1112, such as for solving a candidate block with one or more applicable transactions, such as in a similar fashion. Accordingly, Sensor 1 may, for example, effectively run out of funds comprising its digital currency wallet and, as such, may need to de-prioritize its tasks, seek a loan, or otherwise cease its activity altogether. This may, for example, put a stop to its malicious behavior in a timely manner (e.g., rather than after the fact, etc.). This may also create disincentives to engage in such illicit behaviors, may create incentives to avoid error-prone behaviors, or the like. Further, peers detecting potential misbehavior may be given incentives to expend their resources to detect a problem. As also illustrated generally at 1114, 1116, 1118, 1120, and 1122 these or like micropayments, such as along with smart contract 1102, if applicable, may, for example, be recorded in a blockchain 1124 (e.g., in a Block R, etc.) in a like fashion, such as in connection with corresponding transactions, which may also be timestamped.

Figure 12:
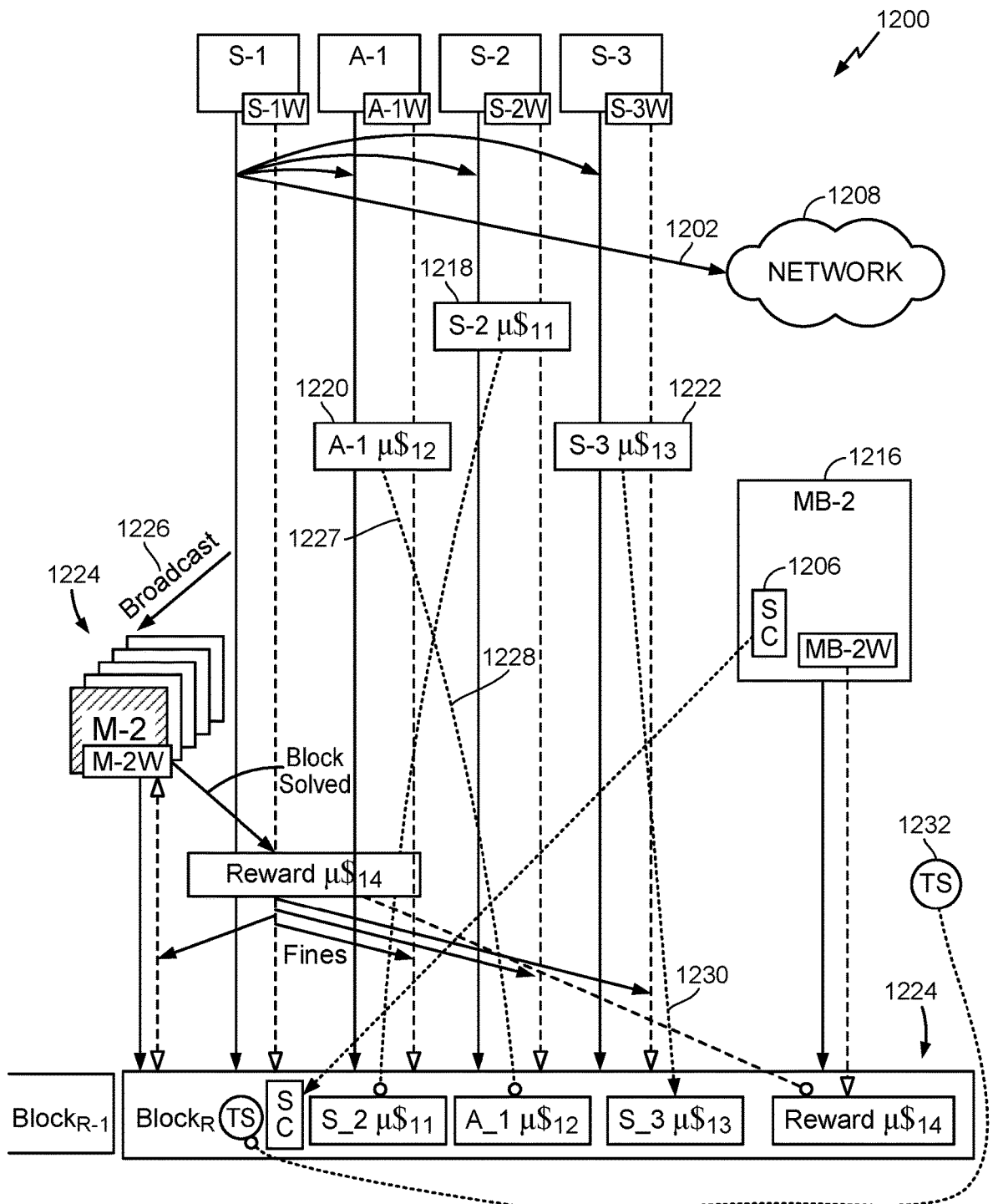
FIG. 12 is a conceptual state diagram illustrating an implementation of an example peer anomaly detection process.

FIG. 12 is a conceptual state diagram illustrating an implementation of an example peer anomaly process 1200 that may be used, in whole or in part, to facilitate and/or support one or more operations and/or techniques for a blockchain for securing and/or managing IoT network-type infrastructure. Likewise, example process 1200 may, for example, comprise one or more aspects of example use case or scenario 1100, such as discussed above with reference to FIG. 11. Thus, one or more IoT devices of FIG. 12 may, for example, correspond to and/or share common features with like or similar IoT devices of FIG. 11. Again, claimed subject matter is not so limited. For example, one or more devices other than those illustrated in FIGS. 11 and/or 12 may be employed herein, in whole or in part.

Thus, as illustrated at 1202, a Sensor (S-1), referenced at 1204, in violation of a smart contract 1206 may, for example, attempt to make an illicit direct connection to a network 1208, which may be visible to its peers, sensors (S-2) and (S-3), referenced at 1210 and 1212, and an actuator (A-1), referenced at 1214. As was indicated, smart contract 1206 may, for example, be distributed from a middlebox (MB-2) 1216 and may run locally on applicable IoT devices, and/or monitored centrally on middlebox 1216, such as based, at least in part, on inputs from these devices. As also seen, one or more applicable transactions, such as captured via micropayments $\mu\$_{11}$, and $\mu\$_{12}$, and $\mu\$_{13}$, for example, illustrated herein generally as (S-2, $\mu\$_{11}$), (A-1, $\mu\$_{12}$), and (S-3, $\mu\$_{13}$) at 1218, 1220, and 1222, respectively, may be assembled in a candidate block and broadcast to participating miners 1224, as referenced generally at 1226.

A candidate block may, for example, be solved (Block R Solved!), such as by a winning miner M-2, in this example, and may be recorded in a blockchain 1224 (e.g., in a Block R, etc.), such as to comprise an audit trail of recorded electronic transactions, as illustrated generally at 1227, 1228, and 1230, which may also be timestamped, if appropriate, as referenced at 1232. As also seen, sensor 1204 may, for example, pay fines to all the anomaly detectors, such as sensors 1210 and 1212 as well as actuator 1214, including to winning miner M-2 for solving an applicable blockchain puzzle. As also illustrated and as previously discussed, smart contract 1206 may also be recorded in blockchain 1224, such as in certain example implementations. Again, it should be noted that claimed subject matter is not limited to a particular use case or scenario, IoT device, electronic transaction, etc. shown.

As was also indicated, in some instances, it may be useful, for example, to improve and/or optimize information propagation and/or consumption of different resources associated with an IoT network. For example, with a cost-effective integrated metric, such as a micropayment supporting electronic transactions, it may be possible to dynamically change a value of resource access to effectively prioritize requests based, at least in part, on a demand-side model, such as utilizing dynamic pricing. As such, again, an integrated cost metric for centrally coordinated, fully distributed, or like cost-based services may, for example, be advantageously employed, in whole or in part, so as gain a "free-market" for resource allocation, which, at times, may be representative of Quality of Service (QoS).

Thus, as discussed below, at times, dynamic pricing may, for example, be implemented via the same or similar infrastructure, such as discussed herein in connection with one or more operations and/or techniques for a blockchain for securing and/or managing IoT network-type infrastructure. If multiple simultaneous resource requests cannot be sufficiently satisfied, for example, in some instances, an arbitration mechanism may be implemented, such as to prioritize among these requests. Thus, even though a micropayment value discussed herein may be determined, at least in part, experimentally and may be pre-defined and/or configured (e.g., arbitrarily, etc.) via relatively small tracking micropayments, for example, at times, prices may also reflect relative value. For example, if multiple requests are competing for access to a particular resource, it may be possible to effectively create a framework for resource allocation use, which, in some instances, may include auctions or other forms of price negotiation, such as along with price supports and/or subsidies to make sure that essential services may be delivered in accordance with an applicable network policy. Policies for allocation according to price may be implemented, in whole or in part, in distributed manner across nodes using smart contracts, such as to make one or more local decisions, for example, which may or may not be globally coordinated (e.g. among peers) rather than depending upon a trusted central authority. Again, as in the previous peer-to-peer case, pricing and/or allocation may, for example, be dynamically adjustable using a second bid selection consensus algorithm, such as in addition to and/or distinct from a consensus algorithm at least partially used to determine which block to validate for addition to a blockchain.

A node, whether it be sensor, actuator, middlebox, miner, etc. may participate in these or like decisions depending upon their own resource constraints. Participants in the decision may, for example, have separate additional transactions with their own incentives awarded for their participation in the decision-making processes, such as mirroring a mechanism for block additions. A degenerate case of a middlebox making a decision for one or more sensors and/or actuators it coordinates and/or protects may amount to a consensus algorithm of one, and, therefore, may be especially trusted and/or hardened against one or more failures.

Figure 13:
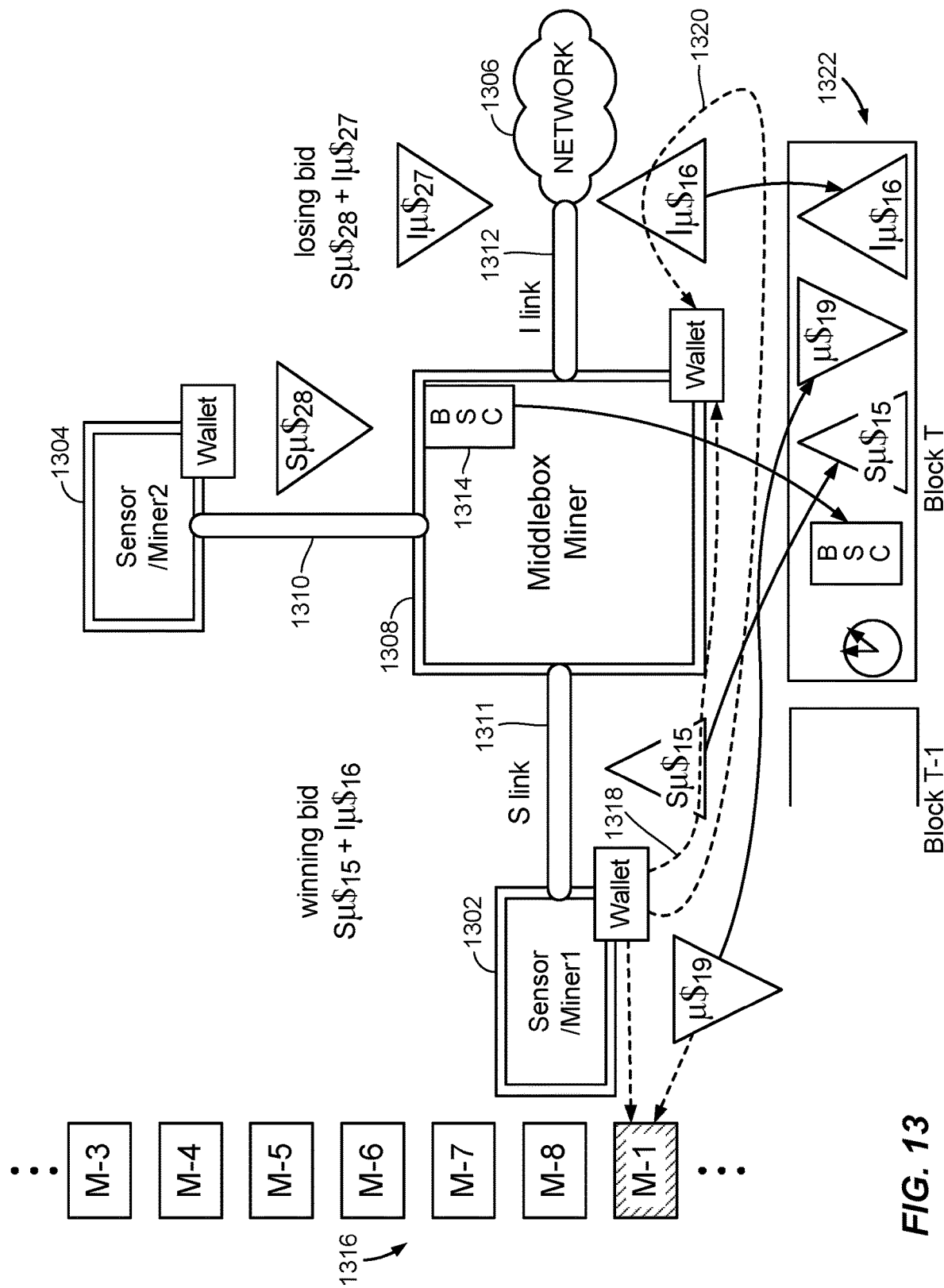
FIG. 13 illustrates an implementation of an example use case or scenario for dynamic pricing.

FIG. 13 illustrates a particular implementation of an example use case or scenario 1300 for dynamic pricing that may be used, in whole or in part, to facilitate and/or support one or more operations and/or techniques for a blockchain for securing and/or managing IoT network-type infrastructure. As seen, competing IoT devices, such as a sensor/miner 1, referenced at 1302, and a sensor/miner 2, referenced at 1304, may, for example, make respective bids for a communication channel with a higher data transfer rate all the way to a network 1306 (e.g., the Internet, etc.). As shown in this example, a particular bid may comprise, for example, a number of transactions comprising separate pricing (e.g., sub-bids, etc.) for a channel to a middlebox 1308 and for a channel to network 1306, such as captured via respective micropayments. For example, sensor/miner 1302 may make a bid for a larger "pipe" to network 1306 comprising a micropayment $\mu\$_{15}$ for an S link 1311 (e.g., to middlebox 1308) and a micropayment $\mu\$_{16}$ for an I link 1312 (e.g., from middlebox 1308 to network 1306).

Similarly, sensor/miner 1304 may, for example, make a bid comprising a micropayment $\mu\$_{28}$ for a link 1310 (e.g., to middlebox 1308) and a micropayment $\mu\$_{27}$ for I link 1312 (e.g., from middlebox 1308 to network 1306). In some instances, a particular IoT device, such as middlebox 1308, for example, may act as an auctioneer conducting an auction in accordance with terms of a particular service-level or like agreement, such as a bandwidth smart contract, as one example, referenced herein at 1314. Or a collection of active nodes, may separately validate one or more broadcasted bids, for example, and may form a consensus as to which bids are best or suitable, generally the highest proposed payment, and once this consensus is reached, it may be wrapped in a smart contract protected authorization transaction added to a blockchain or to a sidechain.

A candidate block comprising, for example, electronic transactions captured via micropayments for a winning bid (e.g., $\mu\$_{15}+\mu\$_{16}$) may be broadcasted to miners 1316 and may be subsequently solved, such as by a miner M-1, in this example. Consequently, as referenced at 1318 and 1320, appropriate funds may be deducted from a wallet of winning sensor/miner 1302 and paid to appropriate parties, such as to middlebox 1308 for providing appropriate communication channels (e.g., via micropayments $\mu\$_{15}+\mu\$_{16}$), for example, and to winning miner M-1 for solving an applicable puzzle (e.g., via a micropayment $\mu\$_{19}$). As also seen, applicable transactions may, for example, be timestamped, if appropriate, and may be recorded in Block T of a blockchain 1322 in a suitable manner, such as along with terms of bandwidth smart contract 1314, for example, in a like fashion. Over time, middlebox 1308 may, for example be capable of adjusting price floors and/or bounds on bids, which may also be governed by bandwidth smart contract 1314 and/or a separate smart contract (not shown).

Figure 14:
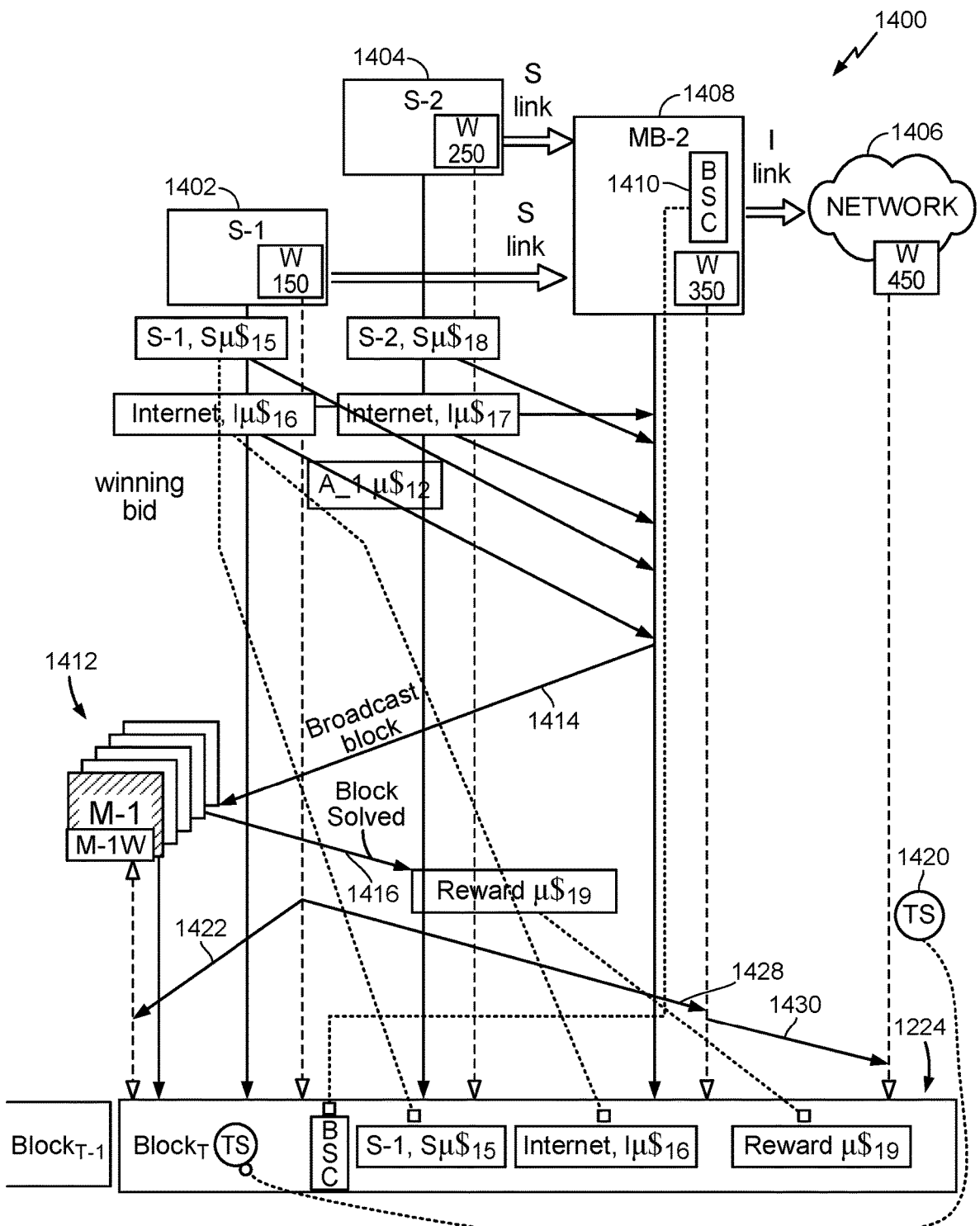
FIG. 14 is a conceptual state diagram illustrating an implementation of an example dynamic pricing process.

FIG. 14 is a conceptual state diagram illustrating an implementation of an example dynamic process 1400 that may be used, in whole or in part, to facilitate and/or support one or more operations and/or techniques for a blockchain for securing and/or managing IoT network-type infrastructure. Similarly, here, example process 1400 may, for example, comprise or more aspects of example use case or scenario 1300, such as discussed above with reference to FIG. 13. Thus, one or more IoT devices of FIG. 14 may, for example, correspond to and/or share common features with like or similar IoT devices of FIG. 13. Again, claimed subject matter is not so limited. For example, one or more devices other than those illustrated in FIGS. 13 and/or 14 may be employed herein, in whole or in part.

As illustrated in this particular example, two IoT devices, such as a sensor/miner (S-1), referenced at 1402, and a sensor/miner (S-2), referenced at 1404, may, for example, compete for a higher bandwidth communication channel to a network 1406, such as via making respective bids to a middlebox 1408. As alluded to previously, these or like bids may, for example, be expressed via electronic transactions captured via corresponding micropayments, here, (S-1, $S\mu\$_{15}$)+(Internet, $I\mu\$_{16}$) by sensor/miner 1402, and (S-2, $S\mu\$_{18}$)+(Internet, $I\mu\$_{17}$) by sensor/miner 1404. Middlebox 1408, such as utilizing terms of a bandwidth smart contract 1410, for example, may determine a winning bid (e.g., (S-1, $S\mu\$_{15}$)+(Internet, $I\mu\$_{16}$) by sensor/miner 1402), which may be broadcasted to miners 1412 as part of a candidate block, as referenced at 1414. As referenced at 1416, a particular miner, such as a miner M-1, for this example, may solve an applicable puzzle, for example, and may record a candidate block as a new block T in a blockchain 1418. As also illustrated, applicable transactions that may be recorded in blockchain 1418 may include, for example, a winning bid (e.g., (S-1, $S\mu\$_{15}$)+(Internet, $I\mu\$_{16}$) by sensor/miner 1402 and a coinbase/miner reward transaction (Rewards, $\mu\$_{19}$), which may be timestamped in a suitable manner, as referenced at 1420. Likewise, here, sensor/miner 1402 may pay from its wallet (W-150) to a wallet (M-1W) of winning miner M-1, referenced at 1422, as well as to a wallet (W-350) of middlebox 1408 for providing auction services, as referenced at 1428.

As referenced at 1430, in some instances, middlebox 1408 may, for example, pay from its own wallet (W-350) to a wallet (W-450) of an appropriate external device on network 1406, such as for bandwidth-related services, if applicable. These or like payments may, for example, be a variant of a delegation use case or scenario, such as discussed above with reference to FIG. 9, for example. As also seen, terms of bandwidth smart contract 1410 may, for example, also be encapsulated in Block T and may be used, at least in part, as a forensics tool for audit, legal and/or regulatory compliance, or the like. Again, it should be noted that claimed subject matter is not limited to a particular use case or scenario, IoT device, electronic transaction, etc. shown.

Accordingly, as discussed herein, a blockchain for securing and/or managing IoT network-type infrastructure may provide benefits. For example, IoT devices with access to a blockchain's communications network may mine for new digital currencies (e.g., Bitcoin, etc.) and/or alternative digital currencies (e.g., Ripple, Bitcoin-NG, etc.), as well as spend digital currencies for services they may consume. As discussed herein, a particular IoT device may, for example, hold and/or delegate to a wallet of digital assets that it may fill based, at least in part, on work done and/or empty based, at least in part, on resources needed and/or requested. A blockchain shared among IoT devices on a network (e.g., public, private, etc.) may, for example, hold electronic transactions as well as those of networked peers. Such an infrastructure, thus, may be advantageously used, at least in part, at micro-credit and/or micro-debit granularity, such as to regulate behavior of a variety of devices, systems, applications, or the like. At times, it may also extend a market incentives model for good behavior beyond that of blockchain miners themselves, for example. In some instances, a blockchain for securing and/or managing IoT network-type infrastructure may also be implemented in connection with suitable processors, higher-level software, etc. such embedded via one or more appropriate functionalities, for example, for tracking IoT or like network-related activities via a wallet to record digital assets earned and/or spent, as well as "publishing" that record in the form of a distributed blockchain for purposes of validation and/or audit.

As was also discussed, digital currency may, for example, be reallocated from power rich sources (e.g. an IoT gateway with a direct connection to a power grid, etc.) to power-constrained devices, such as an IoT sensor and/or actuator. As such, another benefit may be that by controlling transfers and/or monitoring expenditures it may, for example, be possible to create an enforceable policy-based access to other resources. A particular IoT device may, for example, be granted restricted access to resources if it can't pay for them based, at least in part, on its budget or allowance of digital currency and/or a current price. It may overspend its allowance if it has been granted "credit", for example, but that may flag a security system to be more observant and such a device may be required to "pay back" such a loan, which may be based, at least in part, on future revenues. Accordingly, in some instances, such an infrastructure may act as a monitoring system, for example, in which one or more excessive transactions may be evidence of a security compromise. Security, thus, may become a unified distributed computing service, for example, in that it may be peer-to-peer, centralized, decentralized, etc., such as depending on where applicable authorizations may be set and/or enforced. In some instances, wallets may, for example, be implemented, in whole or in part, in one or more special hardware protected trusted execution environments (TEE) and/or enclaves to securely segregate their actions form other processes running on a device. There may be multiple such TEE/enclaves running simultaneously on a single device's computer processor.

As was also indicated, otherwise "idle" cycles used, in whole or in part, by capable IoT devices for mining may, for example, earn digital currencies that may be banked (e.g., in local wallets, etc.) and may be expended as one or more electronic transactions. In some instances, these transactions may, for example, enable optimized fine-grained resource use and/or tracking of costs to deploy and/or run one or more applicable services via a use of a single integrated cost metric, such as a digital currency micropayment. For example, a higher-level IoT device, such as a middlebox may churn away validating transactions if one or more associated sensors and/or actuators are quiet, occasionally being first to validate a block and thereby earning a reward that the middlebox may hold in its wallet. It may then turn around and transfer a fraction of the balance in its wallet to its one or more constituent sensors and/or actuators, for example, while reserving some for its own use. Unlike conventional blockchains, a size of a reward may, for example, be tied, at least in part, to maintaining a fairly constant average balance across an infrastructure being monitored.

Further, with a cost-effective digital currency supporting electronic transactions, at times, it may be possible to change a value of resource access, such as to more effectively prioritize requests, for example, based, at least in part, on a demand-side economic model. As such, again, an integrated cost metric for centrally coordinated, fully distributed, or like cost-based services may, for example, be advantageously employed, in whole or in part, so as gain a "free-market" for resource allocation, which, at times, may be representative of Quality of Service (QoS). In addition, security analytics may, for example, be applied to both new transactions in flight to eliminate those that do not satisfy local requirements early, as well as transactions already added to blocks that are being validated by comparing to a historical record of a blockchain. This may also facilitate and/or support point-of-sale and/or post-purchase fraud detection in credit card, banking, or like systems, but with advantages of being highly distributed and/or resilient. Of course, such a description of certain aspects of a blockchain for securing and/or managing IoT network-type infrastructure and its benefits is merely an example, and claimed subject matter is not so limited.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present disclosure, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present disclosure, use of the term "Hadoop" is intended to include versions, presently known and/or to be later developed.

In the context of the present disclosure, the term "network device" refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term "electronic file" and/or the term "electronic document" or the like are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

As was indicated, in the context of the present disclosure, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, $4^{th}$, or 5th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course. For example, in some instances, a network may comprise an IoT centric network, such as discussed above.

Figure 15:
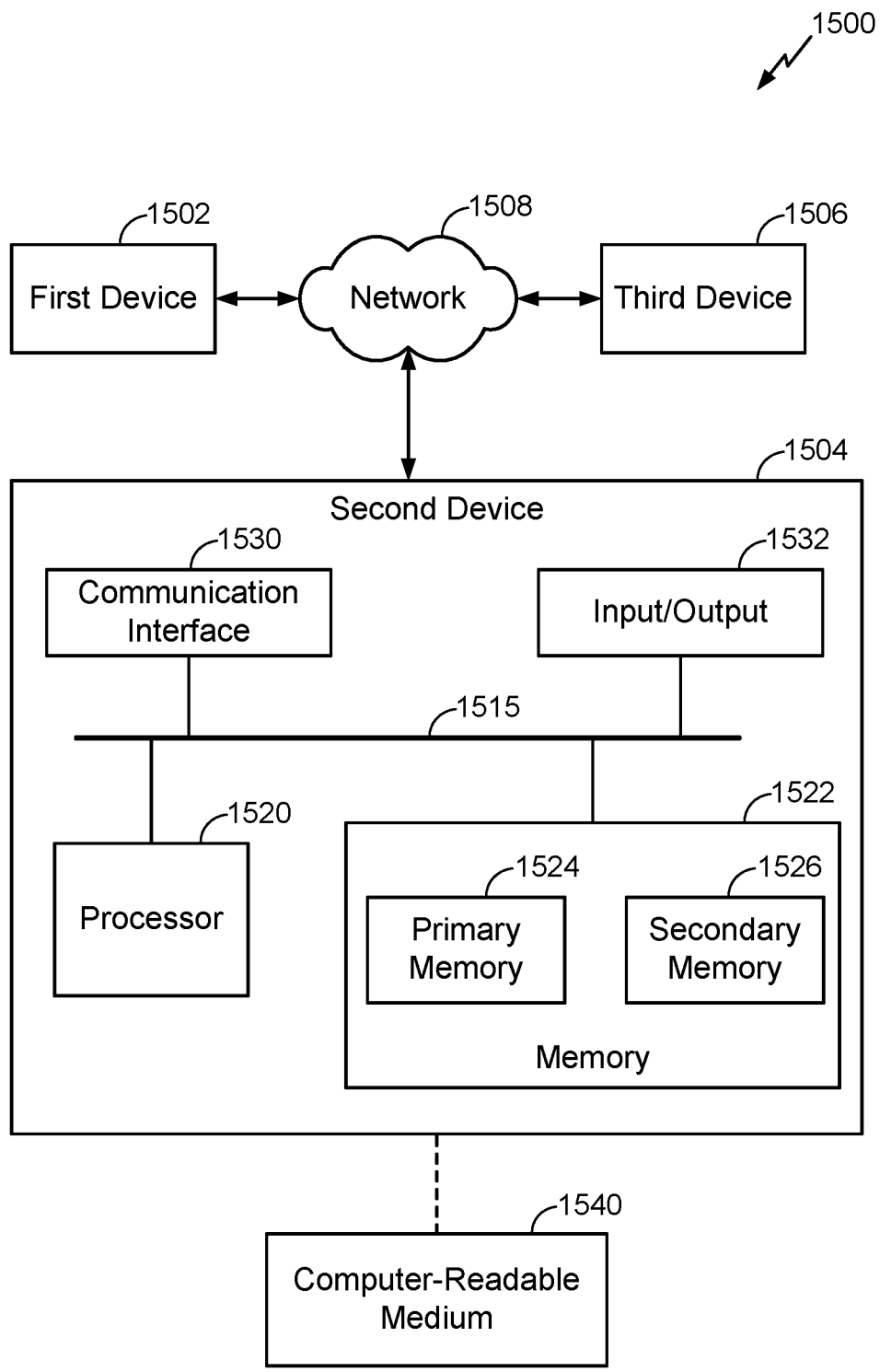
FIG. 15 is a schematic diagram illustrating an implementation of an example computing environment.

In one example embodiment, as shown in FIG. 15, a system embodiment may comprise a local network (e.g., a second device 1504 and a computer-readable medium 1540) and/or another type of network, such as a computing and/or communications network. For purposes of illustration, therefore, FIG. 15 shows an embodiment 1500 of a system that may be employed to implement either type or both types of networks, such as in connection with one or more operations and/or techniques for a blockchain for securing and/or managing IoT network-type infrastructure. Network 1508 may comprise one or more network connections, links, processes, services, applications, and/or resources to facilitate and/or support communications, such as an exchange of communication signals, for example, between a computing device, such as 1502, and another computing device, such as 1506, which may, for example, comprise one or more client computing devices and/or one or more server computing device. By way of example, but not limitation, network 1508 may comprise wireless and/or wired communication links, telephone and/or telecommunications systems, Wi-Fi networks, Wi-MAX networks, the Internet, a local area network (LAN), a wide area network (WAN), an IoT centric network and/or protocol, or any combinations thereof. Again, particular examples of IoT centric wireless networks and protocols were discussed above.

Example devices in FIG. 15 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112 (f) so that it is specifically intended that 35 § USC 112 (f) not be implicated by use of the term "computing device" and/or similar terms; however, if it is determined, for some reason not immediately apparent, that the foregoing understanding cannot stand and that 35 § USC 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-3, 5, 7, 9, 11, and 13, and the corresponding description in the present disclosure.

As further illustrated in FIG. 15, in an embodiment, first and third devices 1502 and 1506 may be capable of rendering a graphical user interface (GUI) for a network device and/or a computing device, for example, so that a user-operator may engage in system use. Device 1504 may potentially serve a similar function in this illustration. Likewise, in FIG. 15, computing device 1502 ('first device' in figure) may interface with computing device 1504 ('second device' in figure), which may, for example, also comprise features of a client computing device and/or a server computing device, in an embodiment. Processor (e.g., processing device) 1520 and memory 1522, which may comprise primary memory 1524 and secondary memory 1526, may communicate by way of a communication bus 1515, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 1504, as depicted in FIG. 15, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. As also discussed, a computing device and/or a networking device may also have other identities. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 15, computing device 1502 may provide one or more sources of executable computer instructions in the form physical states and/or signals (e.g., stored in memory states), for example. Computing device 1502 may communicate with computing device 1504 by way of a network connection, such as via network 1508, for example. As previously mentioned, a connection, while physical, may not necessarily be tangible. Although computing device 1504 of FIG. 15 shows various tangible, physical components, claimed subject matter is not limited to computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1522 may comprise any non-transitory storage mechanism. Memory 1522 may comprise, for example, primary memory 1524 and secondary memory 1526, additional memory circuits, mechanisms, or combinations thereof may be used. Memory 1522 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1522 may be utilized to store a program of executable computer instructions. For example, processor 1520 may fetch executable instructions from memory and proceed to execute the fetched instructions. Memory 1522 may also comprise a memory controller for accessing device readable-medium 1540 that may carry and/or make accessible digital content, which may include code, and/or instructions, for example, executable by processor 1520 and/or some other device, such as a controller, as one example, capable of executing computer instructions, for example. Under direction of processor 1520, a non-transitory memory, such as memory cells storing physical states (e.g., memory states), comprising, for example, a program of executable computer instructions, may be executed by processor 1520 and able to generate signals to be communicated via a network, for example, as previously described.

Thus, in some instances, processor 1520 may facilitate and/or support, such as via a communication interface 1530, for example, communicating electronically regarding one or more electronic transactions of one or more Internet of Things (IoT) devices on a network, at least some of the one or more IoT devices comprising at least one of the following: a sensor; an actuator; a middlebox; or any combination thereof, and wherein the one or more electronic transactions occurring substantially in accordance with one or more consensus rules of a blockchain through use of an integrated cost metric. Generated signals may also be stored in memory, also previously suggested. As was also discussed, in some instances, second device 1504 may comprise one or more cryptographic hash accelerators, which may or may not be part of processor 1520. It should be noted that any suitable types of cryptographic accelerators may be utilized herein. For example, in some instances, one or more key generators seeded by random number generators, such as for public key based authentication (e.g. RSA, etc.) and/or block encryption (e.g. AES, etc.) for data protection, at rest (e.g., stored as one or more signals and/or states in memory 1522) or networked.

Memory 1522 may store electronic files and/or electronic documents, such as relating to one or more users, and may also comprise a device-readable medium that may carry and/or make accessible content, including code and/or instructions, for example, executable by processor 1520 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Continuing with FIG. 15, processor 1520 may comprise one or more circuits, such as digital circuits, to perform at least a portion of a computing procedure and/or process. By way of example, but not limitation, processor 1520 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1520 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 15 also illustrates device 1504 as including a component 1532 operable with input/output devices, for example, so that signals and/or states may be appropriately communicated between devices, such as device 1504 and an input device and/or device 1504 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
communicating electronically messages descriptive of one or more digital currency micropayments of one or more devices on a network, at least some of said one or more devices comprising: a sensor; an actuator; or a middlebox, or a combination thereof,
said one or more digital currency micropayments occurring in accordance with one or more rules of a blockchain; and
monitoring traffic associated with the one or more devices for conformance with a smart contract and, in response to detecting an attempt by a violating device to make an unauthorized connection in violation of the smart contract, broadcasting at least one digital currency transaction configured to, upon successful validation, transfer an amount of digital currency from a digital currency wallet associated with the violating device to at least one other device of the one or more devices.

2. The method of claim 1, wherein:
said one or more digital currency micropayments facilitate one or more electronic transactions; and
said one or more electronic transactions comprise: an authentication-related transaction; an authorization-related transaction; a resource allocation-related transaction; a delegation-related transaction; a peer anomaly detection-related transaction; a dynamic pricing-related transaction or a miner reward-related transaction, or a combination thereof.

3. The method of claim 2, wherein at least one of said one or more electronic transactions is authorized based, at least in part, on a smart contract-related restriction; or a digital currency budget-related restriction, or a combination thereof.

4. The method of claim 1, wherein said one or more rules of said blockchain defining transaction validity comprise: a two-party consensus rule; a proof-of-work-type consensus rule; a proof-of-stake-type consensus rule or an algorithmically-determined-randomly-chosen verifiers rule, or a combination thereof.

5. The method of claim 1, wherein said one or more rules of said blockchain defining transaction validity are implemented by at least some of said one or more devices.

6. The method of claim 1, wherein said network comprises: a peer-to-peer-type network; a cellular network; a distributed network; a decentralized network; a wireless communications network or a wired communications network, or a combination thereof.

7. The method of claim 1, wherein said blockchain comprises: a public blockchain or a private blockchain, or a combination thereof.

8. The method of claim 1, wherein said blockchain comprises at least one sidechain blockchain.

9. The method of claim 1, wherein said one or more rules of said blockchain defining transaction validity are implemented substantially during idle cycles of respective processing units of said one or more devices.

10. The method of claim 1, wherein at least one of said one or more digital currency micropayments is commensurate with: an identity of a particular device of said one or more devices or a function of a particular device of said one or more devices, or a combination thereof.

11. The method of claim 1, wherein said one or more devices comprise one or more Internet of Things (IoT) devices.

12. An apparatus comprising:
one or more processors coupled to a memory to:
communicate electronically messages descriptive of one or more digital currency micropayments of one or more devices on a network, at least some of said one or more devices to comprise one or more of: a sensor; an actuator; or a middlebox,
said one or more digital currency micropayments to occur in accordance with one or more rules of a blockchain to define transaction validity through use of an electronic payment; and
monitor traffic associated with the one or more devices for conformance with a smart contract and, in response to detection of an attempt by a violating device to make an unauthorized connection in violation of the smart contract, broadcast at least one digital currency transaction configured to, upon successful validation, transfer an amount of digital currency from a digital currency wallet associated with the violating device to at least one other device of the one or more devices.

13. The apparatus of claim 12, wherein at least one of said one or more digital currency micropayments is to be commensurate with: an identity of a particular device of said one or more devices; or a function of a particular device of said one or more devices, or a combination thereof.

14. The apparatus of claim 12, wherein:
said one or more digital currency micropayments facilitate one or more electronic transactions; and
said one or more electronic transactions to comprise: an authentication-related transaction; an authorization-related transaction; a resource allocation-related transaction; a delegation-related transaction; a peer anomaly detection-related transaction; a dynamic pricing-related transaction or a miner reward-related transaction, or a combination thereof.

15. The apparatus of claim 14, wherein at least one of said one or more electronic transactions is authorized based, at least in part, on a smart contract-related restriction or a digital currency budget-related restriction, or a combination thereof.

16. The apparatus of claim 12, wherein said network to comprise: a peer-to-peer-type network; a cellular network; a distributed network; a decentralized network; a wireless communications network or a wired communications network, or a combination thereof.

17. An article comprising:
a non-transitory storage medium having instructions stored thereon executable by a special purpose computing platform to:
- communicate electronically messages descriptive of one or more digital currency micropayments of one or more devices on a network, at least some of said one or more devices to comprise: a sensor; an actuator; or a middlebox, or a combination thereof,
- said one or more digital currency micropayments to occur in accordance with one or more rules of a blockchain to define transaction validity through use of an electronic payment; and
- monitor traffic associated with the one or more devices for conformance with a smart contract and, in response to detection an attempt by a violating device to make an unauthorized connection in violation of the smart contract, broadcast at least one digital currency transaction configured to, upon successful validation, transfer an amount of digital currency from a digital currency wallet associated with the violating device to at least one other device of the one or more devices.

\* \* \* \* \*